United States Patent
Wako

(10) Patent No.: US 7,171,304 B2
(45) Date of Patent: Jan. 30, 2007

(54) NAVIGATION METHOD AND APPARATUS TO DEFINE FAVORITE SPOT AND EXTRACT INFORMATION CONCERNING THE FAVORITE SPOT

(75) Inventor: Hikaru Wako, Redondo Beach, CA (US)

(73) Assignee: Alpine Electronics, Inc., Tokyo (JP)

( * ) Notice: Subject to any disclaimer, the term of this patent is extended or adjusted under 35 U.S.C. 154(b) by 253 days.

(21) Appl. No.: 10/847,744

(22) Filed: May 18, 2004

(65) Prior Publication Data

US 2005/0261822 A1 Nov. 24, 2005

(51) Int. Cl.
*G01C 21/26* (2006.01)

(52) U.S. Cl. .................... 701/200; 701/202; 340/995.1

(58) Field of Classification Search ........ 701/200–202, 701/208–209, 23, 25, 26, 117; 340/995.1, 340/988
See application file for complete search history.

(56) References Cited

U.S. PATENT DOCUMENTS

| 6,429,813 B2* | 8/2002 | Feigen ................... 342/357.13 |
| 6,622,087 B2* | 9/2003 | Anderson ................... 701/209 |
| 2002/0183924 A1 | 12/2002 | Yokota |

* cited by examiner

*Primary Examiner*—Y. Beaulieu
(74) *Attorney, Agent, or Firm*—Muramatsu & Associates

(57) ABSTRACT

A method and apparatus for use with a navigation system allows a user to define and edits a favorite spot and retrieves points of interest (POI) information or other information associated with the favorite spot. The method includes the steps of creating a favorite spot by selecting a location on a map image displayed on the navigation system and setting a size of the favorite spot, selecting one of the favorite spots created in the navigation system, and retrieving information associated with the selected favorite spot. The navigation is able to inform the user that the user has entered a favorite spot or has left a favorite spot.

20 Claims, 24 Drawing Sheets

Fig. 5C

| | Edit | Input Favorite Spot Name | | | | | | | |
|---|---|---|---|---|---|---|---|---|---|
| Favorite: | _ | | | | | | | | 71 |
| 1 | 2 | 3 | 4 | 5 | 6 | 7 | 8 | 9 | 0 |
| A | B | C | D | E | F | G | H | I | J |
| K | L | M | N | O | P | Q | R | S | T |
| U | V | W | X | Y | Z | & | ' | More | |
| ← | Delete | | Space | | Save | | | Top | |

Fig. 5D

| | Edit | Input Favorite Spot Name | | | | | | | |
|---|---|---|---|---|---|---|---|---|---|
| Favorite: | BEACH_ | | | | | | | | 71 |
| 1 | 2 | 3 | 4 | 5 | 6 | 7 | 8 | 9 | 0 |
| A | B | C | D | E | F | G | H | I | J |
| K | L | M | N | O | P | Q | R | S | T |
| U | V | W | X | Y | Z | & | ' | More | |
| ← | Delete | | Space | | Save | | | Top | | from Fig. 7B from Fig. 7C

NAVIGATION METHOD AND APPARATUS TO DEFINE FAVORITE SPOT AND EXTRACT INFORMATION CONCERNING THE FAVORITE SPOT

FIELD OF THE INVENTION

This invention relates to a method and apparatus for use with a navigation system for retrieving information, and more particularly, to a method and apparatus for defining and editing a favorite spot and retrieving points of interest (POI) information or other information associated with the favorite spot.

BACKGROUND OF THE INVENTION

A navigation system, typically a vehicle navigation system, performs travel guidance for enabling a user to easily travel to a selected destination. Such a navigation system detects the position of the user or a vehicle having the navigation system, reads out map data pertaining to an area from a data storage medium, for example, a CD-ROM (compact disk read-only memory) or a DVD (digital videodisc) or a hard disc. The current user (vehicle) position is determined by a combination of a self-contained navigation sensors (distance traveled sensor, bearing sensor, etc.) and a global positioning system (GPS) satellite.

FIGS. 1A–1H show an example of overall procedure and screen display involved in the navigation system. FIG. 1A shows an example of locator map screen of the navigation system when the destination is not specified. Typically, the navigation system displays a street on which the vehicle (current vehicle position VP) is running on a map image and a name of the street. Other information such as a north pointer NP, a map scale and a current time may also be illustrated on the display screen. The navigation system does not perform the route guidance function until a destination is specified.

FIGS. 1B–1D show an example of process for specifying a destination in the navigation system. A main menu screen such as shown in FIG. 1B displays menu items including a "Destination" menu for entering the destination. When selecting "Destination", the navigation system displays a "Find Destination by" screen as shown in FIG. 1C for specifying an input method for selecting the destination. The "Find Destination By" screen lists various methods for selecting the destination including "Address" for specifying the city and address of the destination, "Intersection" for specifying the names of two streets which intersect with one another, and "Point of Interest" (POI) for selecting the programmed destination based on the name, category or telephone number. Other methods in the "Find Destination by" screen include "Recent Route" for specifying the destination based on the recent history of destinations saved in the navigation system, and "Address Book" for selecting the address of the destination out of the prescribed address list stored in the system.

When selecting, for example, the "Point of Interest" method in FIG. 1C, the navigation system displays selection methods of point of interest (POI) either by "Place Name" or "Place Type" in FIG. 1D. The "Place Name" is to specify a name of POI, and the "Place Type" is to specify a category of POI. If the "Place Name" is selected in FIG. 1D, the navigation system shows an "Enter Place Name" screen such as shown in FIG. 1E. The screen of FIG. 1E is basically a keyboard for inputting the name in an input box on the monitor screen. The user inputs the name of the desired POI in the input box through the keyboard.

FIG. 1F shows a "Confirm Route" screen of the navigation system for confirming the destination. In this example, the "Confirm Route" screen lists the name, address and phone number of the destination (i.e., the POI specified by the user). If this is the correct destination, the user enters an "OK to Proceed" key to proceed to the next procedure.

In FIG. 1G, the navigation system calculates and determines a guided route to the destination, i.e., the selected POI. The navigation system determines a route to the destination based on, for example, the shortest way to reach the destination, the route using as much freeway as practical or the route without using toll road, and the like. In this example, the navigation system displays a progress scale of the calculation of the route. After determining the guided route, the navigation system starts the route guidance as shown in FIG. 1H. Typically, the navigation system shows the intersection which is highlighted to show the next turn and a direction of the turn. Such route guidance by the navigation system is also given by voice instructions.

As noted above, in setting a destination, the user may select a particular destination by selecting, for example, a point of interest (POI) on a display or by inputting a particular destination by using a keyboard screen display as noted above. In some cases, it is beneficial to search a particular destination within a specific area. For example, a user may want to dine at a restaurant within a particular area when he knows that the traffic condition is favorable in that area.

In the conventional navigation system, a function is provided that allows the user to limit the search of points of interest within a particular city. However, it could not accommodate the situation where the user wish to search an area that crosses a multiplicity of cities or any desired area. In many cases, an area of a city is too large to effectively limit the area to be searched or too small to effectively retrieve desired information. Moreover, the user may wish to know whether he has entered into a particular area as opposed to reaching a particular point.

Accordingly, there is a need for a method and apparatus for use with a navigation system that allows the user to freely specify and modify an area for effectively retrieving points of interest (POIs) information or other information within the specified area.

SUMMARY OF THE INVENTION

It is, therefore, an object of the present invention to provide a method and apparatus for a navigation system that allows the user to freely define an arbitrary area on a map image as a favorite spot for retrieving a point of interest or other information within the favorite spot.

It is another object of the present invention to provide a method and apparatus for defining a favorite spot by allowing the user to freely set a location, size and name of the favorite spot on the map image.

It is a further object of the present invention to provide a favorite spot specifying function for a navigation system that allows the navigation system to search points of interest, event information or traffic associated with the selected favorite spot.

It is a further object of the present invention to provide a method and apparatus for defining a favorite spot and modifying preexisting data on favorite spots by changing a size, name or other parameters of the favorite spot.

It is a further object of the present invention to provide a favorite spot defining method and apparatus for a navigation system that informs the user that the user has entered into the favorite spot.

The method and apparatus of the present invention for use with a navigation system allows a user to define a favorite spot and retrieves the desired data associated with the favorite spot. The user is able to define an area on a map image and use the specified spot for retrieving data within the specified area. Such data include points of interest (POIs) for selecting a destination of a travel, or other information such as event information and traffic incident information within the favorite spot.

One aspect of the present invention is a method of defining a favorite spot and retrieving information concerning the favorite spot. The method is comprised of the steps of: creating a favorite spot by selecting a location on a map image displayed on the navigation system and setting a size of the favorite spot; selecting one of the favorite spots created in the navigation system; and retrieving information associated with the selected favorite spot.

Preferably, the step of creating the favorite spot includes a step of setting a shape of the favorite spot, and a step of assigning a name of the favorite spot. Further, the step of creating the favorite spot includes a step of registering the favorite spot in a list of favorite spot names. The step of selecting one of the favorite spots created in the navigation system includes a step of displaying a list of favorite spot names.

In the method of the present invention, the step of retrieving the information associated with the selected favorite spot includes a step of specifying a category of information to be searched for said favorite spot, a step of retrieving the information of the selected category within the favorite spot, and a step of displaying a list of retrieved information.

Preferably, the method of the present invention further comprises a step of editing the data on the favorite spot by changing a size, location, or name of the favorite spot or deleting the favorite spot. Further, the step of editing the data on the favorite spot includes a step of selecting a favorite spot to be edited, a step of selecting an item of the favorite spot to be edited, and a step of changing values of the selected item.

Another aspect of the present invention is an apparatus of defining a favorite spot and retrieving information concerning the favorite spot. The apparatus is comprised of various means for implementing the steps defined in the method noted above. The favorite spot defining and data retrieving apparatus of the present invention includes means for creating a favorite spot by selecting a location on a map image displayed on the navigation system and setting a size of the favorite spot; means for selecting one of the favorite spots created in the navigation system; and means for selecting type of information and retrieving the information associated with the selected favorite spot.

According to the present invention, the user can freely define an area on a map image as a favorite spot and use the favorite spot to search points of interest located within the favorite spot. Moreover, the user can search event information such as movie, sports, concert, etc., or traffic incident information such as accident, congestion, construction, etc., in the favorite spot. The navigation system of the present invention can inform the user that the user has entered into the favorite spot.

BRIEF DESCRIPTION OF THE DRAWINGS

FIG. 4A shows the location of the user's vehicle on the map image, FIG. 4B shows a particular point that the user has specified on the map image, FIG. 4C shows a list of choices and address information of the selected point, FIG. 4D shows a square representing an area of a favorite spot defined by the user, FIG. 4E shows another square representing a favorite spot larger than that of FIG. 4D defined by the user, and FIG. 4F shows a circle representing an area of a favorite spot defined by the user by a different shape of area mark.

FIGS. 5A–5E are display examples depicting the procedure of setting a name of the favorite spot in the present invention. FIG. 5A shows an example of list of favorite spot names, FIG. 5B shows another example of list of favorite spot names, FIG. 5C shows an input screen, FIG. 5D shows another input screen when assigning a new favorite spot name, and FIG. 5E shows a message indicating that the same name already exists.

FIG. 6A shows a main menu screen from which the user can select a particular entry, FIG. 6B shows a list of favorite spot names, FIG. 6C shows a list of place type within a predetermined range or distance when a "Type" is selected in FIG. 6B, and FIG. 6D shows a list of place name when the place type is selected in FIG. 6C.

FIG. 7A shows a list of favorite spots registered in the navigation system, FIG. 7B shows an example of map image of the selected favorite spot and a list of activities where "Find POI" is selected, FIG. 7C shows a case where "Download Event Information" is selected from the list of activities, and FIG. 7D shows a case where "View Traffic Information" is selected.

FIG. 8A shows a list of place types for searching POIs, FIG. 8B shows an example of display informing the user that the search is in progress, FIG. 8C shows an example of display when no POI is found within the selected favorite spot, and FIG. 8D shows the display listing POI names found within the favorite spot selected in FIG. 7A.

FIG. 9A shows that event information is being downloaded, FIG. 9B informs that no event information is available for the selected favorite spot, FIG. 9C shows an example of display listing event information, and FIG. 9D shows an example of display for confirming a destination selected in FIG. 9C.

FIGS. 11–11C are display examples showing the procedure of selecting a particular favorite spot for editing the same where FIG. 11C shows the list of favorite spots registered in the navigation system.

FIG. 12A shows that the favorite spot size is ½ mile by ½ mile, and FIG. 12B shows that the favorite spot size is 1 mile by 1 mile.

FIG. 13B shows a confirmation screen when the user selected to delete the particular favorite spot.

FIG. 14B shows an example of input screen, FIG. 14C is an another example of input screen, and FIG. 14D shows an example of warning indicating that the same name already exists.

DETAILED DESCRIPTION OF THE INVENTION

The method and apparatus of the present invention for defining a favorite spot or a favorite area and retrieving the desired data associated with the favorite spot will be described in detail with reference to the accompanied drawings. The present invention allows the user of a navigation system to define an area on a map image and use the specified favorite area or spot for retrieving data within the specified area. Such data include points of interest (POIs) for selecting a destination of a travel, or other information such as event information and traffic incident information within the favorite spot.

Figure 2:
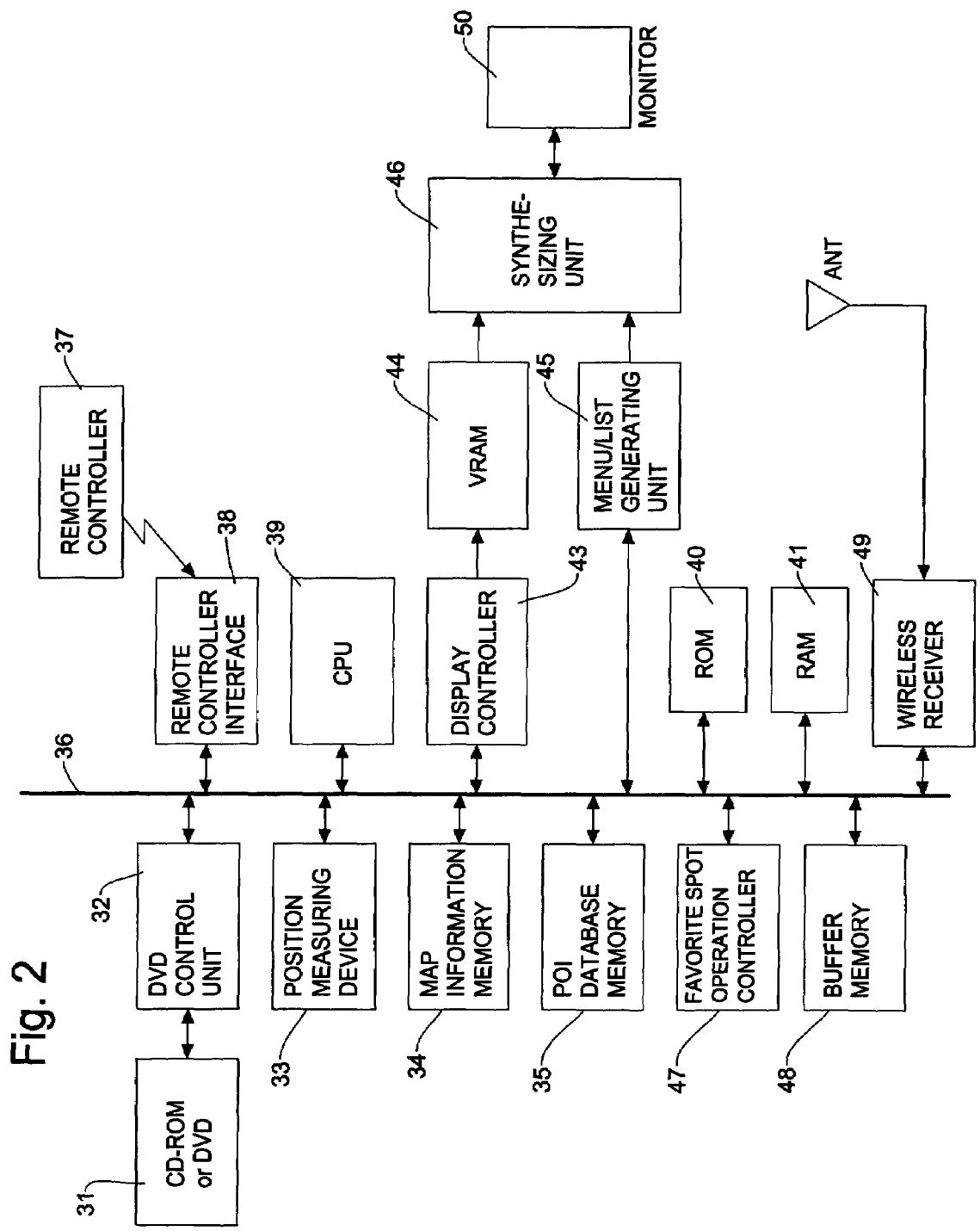
FIG. 2 is a block diagram showing an example of structure in a vehicle navigation system for implementing the present invention for defining a favorite spot and retrieving points of interest or other information associated with the favorite spot.

The navigation system of the present invention is advantageously applicable to a vehicle navigation system. FIG. 2 shows an example of structure of a vehicle navigation system implementing the present invention. It should be noted that the present invention can also be applied to a portable navigation device such as a one implemented by a PDA (personal digital assistant) device, a lap-top computer, or other hand-held devices.

In the block diagram of FIG. 2, the navigation system includes a map storage medium 31 such as a CD-ROM, DVD, hard disc or other storage means (Hereafter "DVD") for storing map information, a DVD control unit 32 for a controlling an operation for reading the map information from the DVD, a position measuring device 33 for measuring the present vehicle position. The position measuring device 33 has a vehicle speed sensor for detecting a moving distance, a gyroscope for detecting a moving direction, a microprocessor for calculating a position, a GPS receiver, and etc.

The block diagram of FIG. 2 further includes a map information (data) memory 34 for storing the map information which is read out from the DVD 31, a database memory 35 for storing database information such as point of interest (POI) information which is read out from the DVD 31, a remote controller 37 for executing a menu selection operation, an enlarge/reduce operation, a destination input operation, etc. and a remote controller interface 38.

The navigation system further includes a bus 36 for interfacing the above units in the system, a processor (CPU) 39 for controlling an overall operation of the navigation system, a ROM 40 for storing various control programs such as a route search program and a map matching program necessary for navigation control, a RAM 41 for storing a processing result such as a guide route, a display controller 43 for generating map image (a map guide image and an arrow guide image) on the basis of the map information, a VRAM (Video RAM) 44 for storing images generated by the display controller, a menu/list generating unit 45 for generating menu image/various list images, a synthesizing unit 46, a favorite spot operation controller 47, a buffer memory 48, a wireless receiver 49, and a monitor (display) 50.

The favorite spot operation controller 47 performs the essential function of the present invention for specifying and editing the favorite spot and retrieving the information within the favorite spot such as points of interest (POIs) information, event information, or traffic information. The favorite spot operation controller 47 receives map data including POI (point of interest) information and current position data created within the navigation system. The favorite spot operation controller 47 also receives information created outside of the navigation system from remote data servers such as an event data server and a traffic information server.

Such event information and traffic information downloaded from the remote server may be stored in the buffer memory 48. The data regarding the favorite spot may also be stored in the buffer memory 48. The favorite spot operation controller 47 evaluates the favorite spot data, current position data, event data, and traffic data, and associates those data with the current position each time when the position of the user changes. The event information and traffic information will be supplied from the corresponding servers directly through the wireless receiver 49 and an antenna or indirectly through public communication networks. As noted above, the map information and POI data are extracted from the DVD 31 and stored in the map memory 34.

Figure 3:
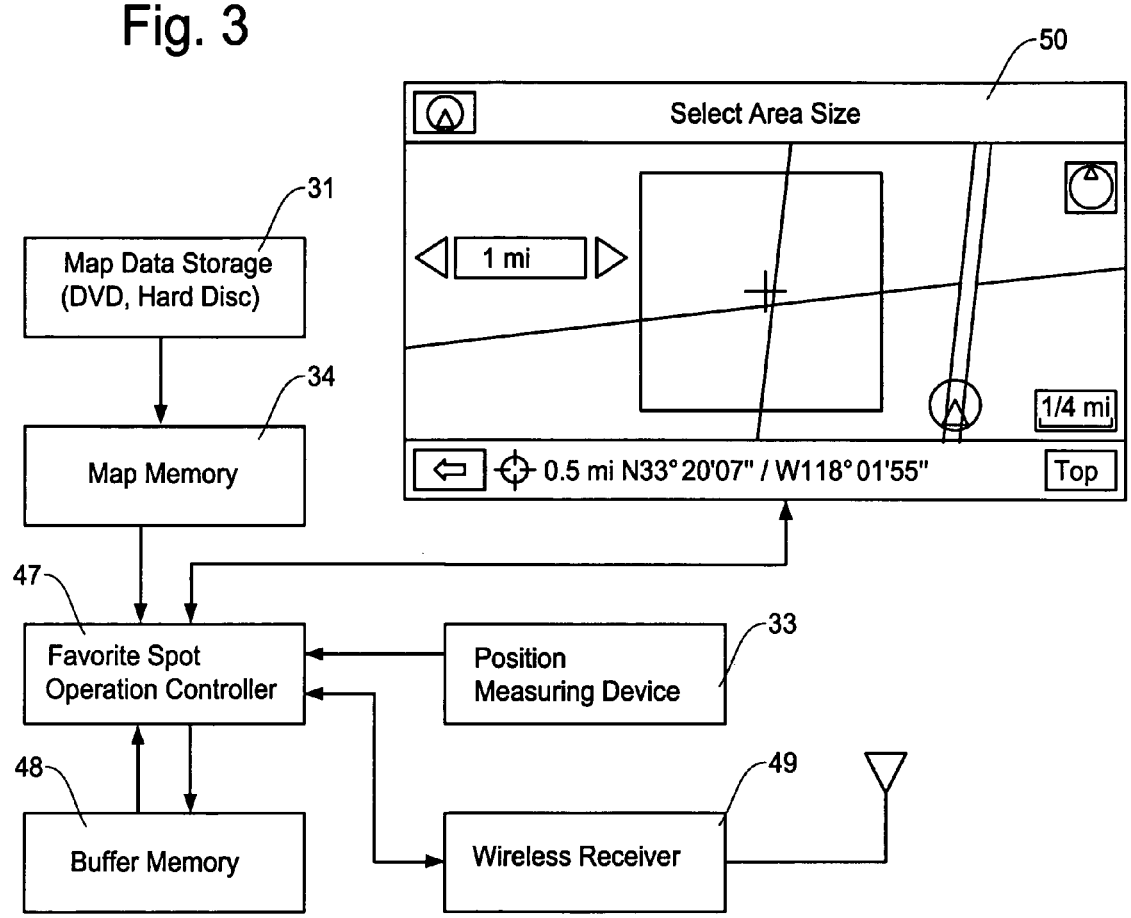
FIG. 3 is a functional block diagram showing a basic structure of the apparatus of the present invention for defining a favorite spot, modifying the favorite spot and retrieving data regarding the favorite spot.

FIG. 3 is a functional block diagram showing an example of basic structure of the apparatus of the present invention for defining and modifying the favorite spot and retrieving data concerning the favorite spot. The structure of FIG. 3 is illustrated by the components in the block diagram of FIG. 2 that are directly related to the operation of the present invention. The components of the apparatus of the present invention includes a monitor 50 for interfacing with the user, and a favorite spot operation controller 47 for controlling an overall operation of the apparatus of the present invention.

The block diagram of FIG. 3 further includes a map data storage 31 such as DVD or hard disc for storing map data, map memory 34 for storing map data from the map data storage 31, wireless receiver 49 for wireless communication with remote data servers, position measuring device 33 for detecting the current position of the user, and buffer memory 48 for temporarily storing various types of data for operation of the apparatus. The favorite spot operation controller 47 can be implemented by the CPU 39 in FIG. 2 or by a separate controller such as a microprocessor. Further, the buffer memory 48 can be implemented by RAM 41 in FIG. 2 or other memory.

As shown in FIG. 3, the navigation system is able to retrieve the map data such as POI (point of interest) information from the map memory 34 and map data storage 31. The navigation system is also able to receive event information and traffic incident information from the remote data servers through the wireless communication network. An example of such wireless communication data service includes an FM radio data service and a satellite radio data service. The event information and traffic incident information are received through the antenna and the wireless receiver 49 and are downloaded in the buffer memory 48 or other data storage in the navigation system.

On the map image displayed on the monitor 50, the user creates a favorite spot and edits the data concerning the favorite spot. The favorite spot operation controller 47 controls the screen display on the monitor 50 to assist the user for defining and editing the favorite spots. Such data concerning the favorite spot may be stored in the buffer memory 48, or the map data storage 31 when the map data storage is configured by a hard disc, or other rewritable storage. The favorite spot operation controller 47 applies the favorite spot information to the POI information, the current position, the route to the destination, the event information, or traffic incident information.

FIGS. 4A–4F are examples of screen display of the navigation system of the present invention showing the steps of defining a favorite spot on a map image. Through this procedure, the user is able to define an arbitrary area on a map image as a favorite spot. The navigation system also provides the user to modify the size and location of the favorite spot on the map image. Then, the user can extract information such as POIs (points of interest) or other information including traffic incident information such as congestion, accident, construction, etc., or event information such as movie, concert, sports, etc.

Figure 4A:
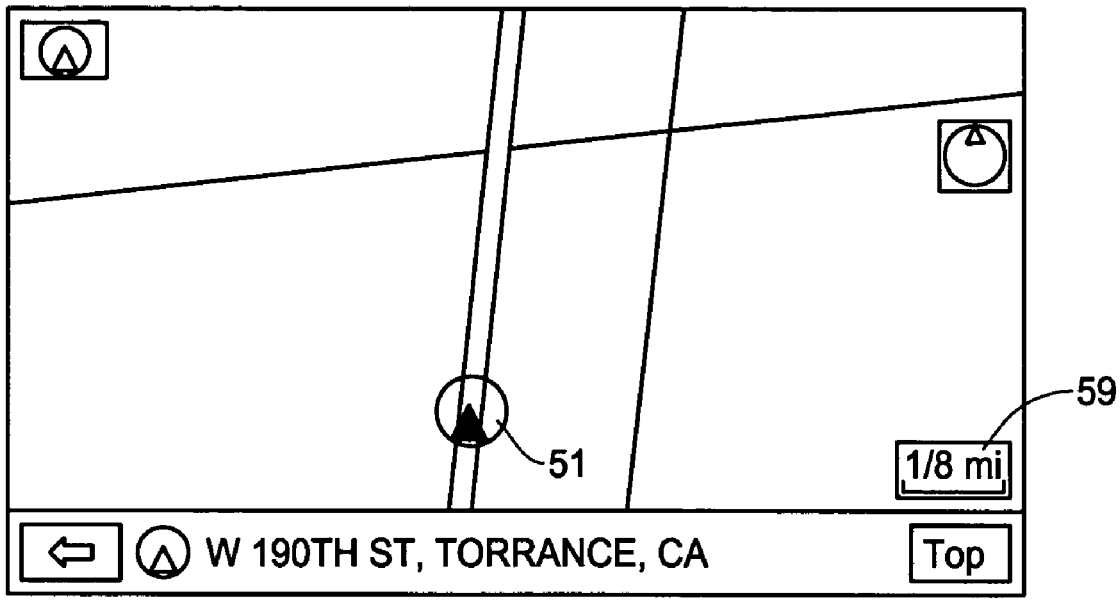
FIGS. 4A–4F are display examples depicting the procedure to define a favorite spot of a desired location and size on a map image in the navigation system of the present invention.

FIG. 4A is an example of display showing the location of the user's vehicle on the map image. In this example, the location of the user, typically a current vehicle position, is represented by a current vehicle position mark 51. A scale indicator 59 on the map image is shown at the lower right corner of the screen to indicate the map scale. The user is able to select a particular point on the display by, for example, operating a cursor (point marker) on the screen or directly pressing the point on the map image on the surface of the touch screen.

Figure 4B:
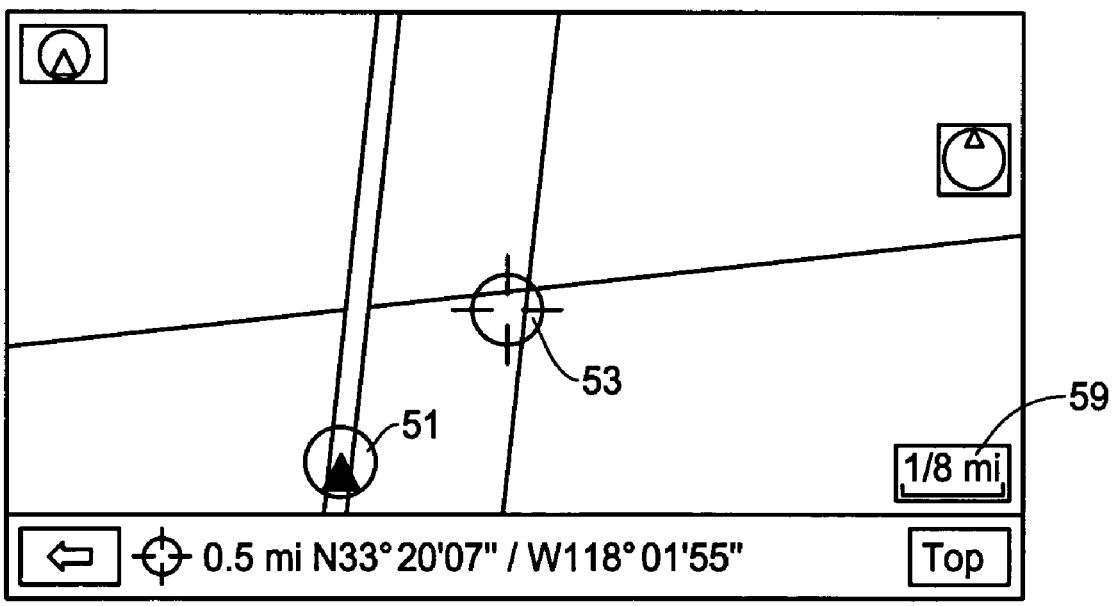

FIG. 4B shows a display example of the navigation system of the present invention where the user selected a particular point by moving a cursor 53 on the screen. As is well known in the art, the user can move the cursor point on the screen freely with use of a remote controller (FIG. 2) or other means. In the example of FIG. 4B, it is so designed that when the cursor 53 points a certain meaningful image on the map, such as a street image or a POI icon, etc. on the map image, a balloon message will show up.

Figure 4C:
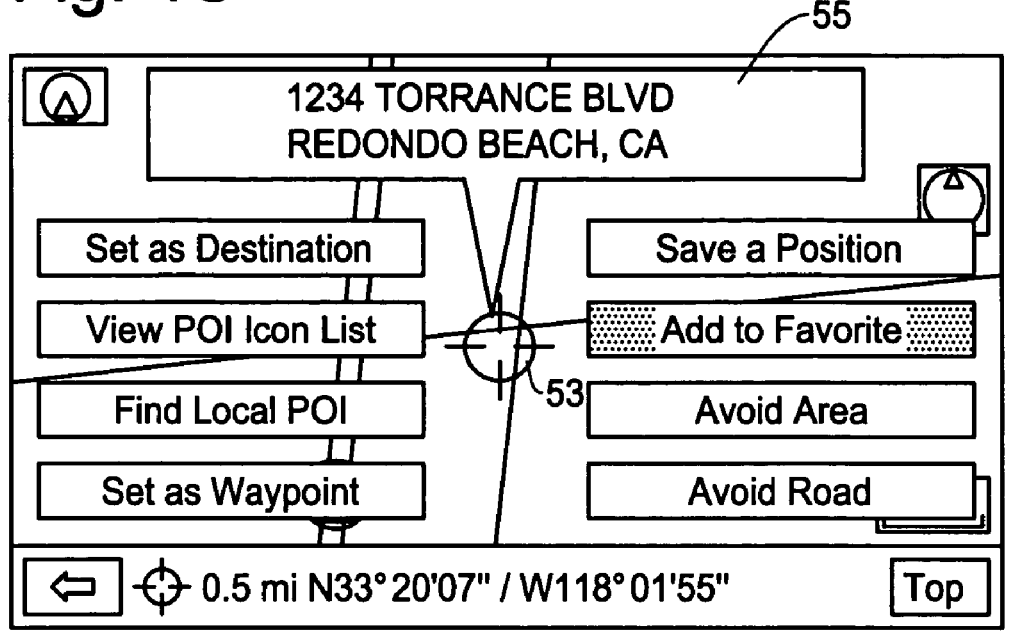
Figure 4D:
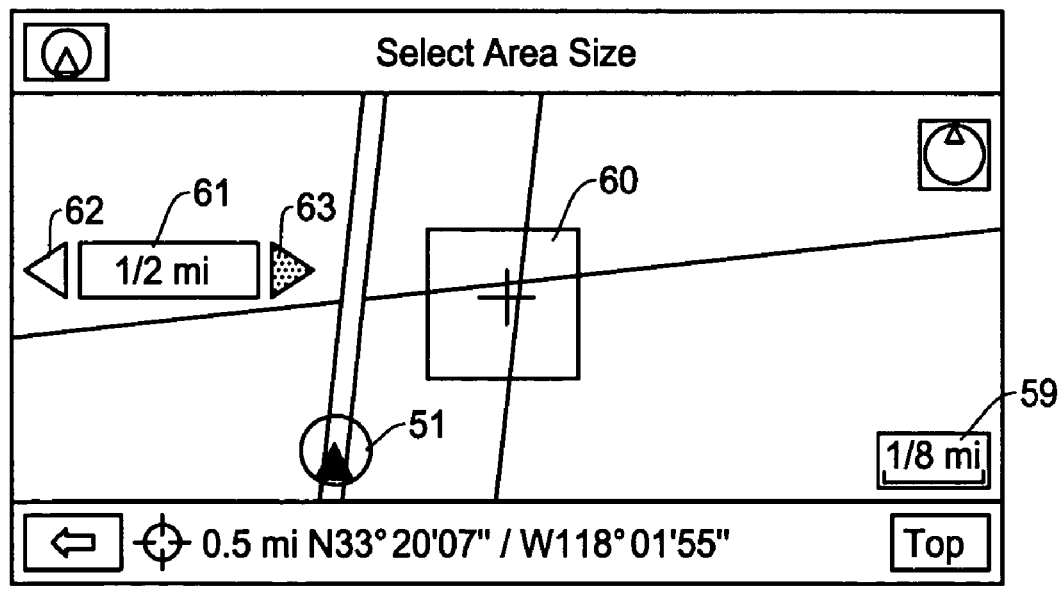

Thus, in FIG. 4C, a balloon message 55 indicating a street address of the selected point will be displayed. The balloon message may further include a name of the place if applicable (such as when the cursor point is on a point of interest), or a latitude and longitude of the cursor point. Preferably, the display screen of the navigation system further shows several menu keys to prompt the user to select one of the activities.

Examples of menu keys in FIG. 4C include a "Set as Destination" key for selecting the cursor point as a destination of the travel, a "View POI Icon List" key for displaying POI icons within the area of the cursor 53, a "Find Local POI" key for searching POIs within a predetermined size of area pointed by the cursor 53, and a "Set as Waypoint" key for selecting the location of the cursor point as a waypoint of the travel. The example of FIG. 4C further includes a "Save Position" key for recording the location in the memory, a "Add to Favorite" key for creating a favorite spot in accordance with the present invention, and "Avoid Area" and "Avoid Road" keys for removing the location of the cursor point 53 from the route to the destination.

As noted above, the "Add to Favorite" key is directly related to the following operation to pursue the favorite spot function of the present invention. When pressing this key, the navigation system displays a screen of FIG. 4D for the user to determine an area size of a favorite spot. In this example, a favorite spot is defined by a square area mark 60 on the screen although other shapes such as a circle, an ellipse or a polygon are also possible. The screen of FIG. 4D also shows a spot scale indicator 61 for showing a size of the square area which is ½ mile by ½ mile in this example.

Figure 4E:
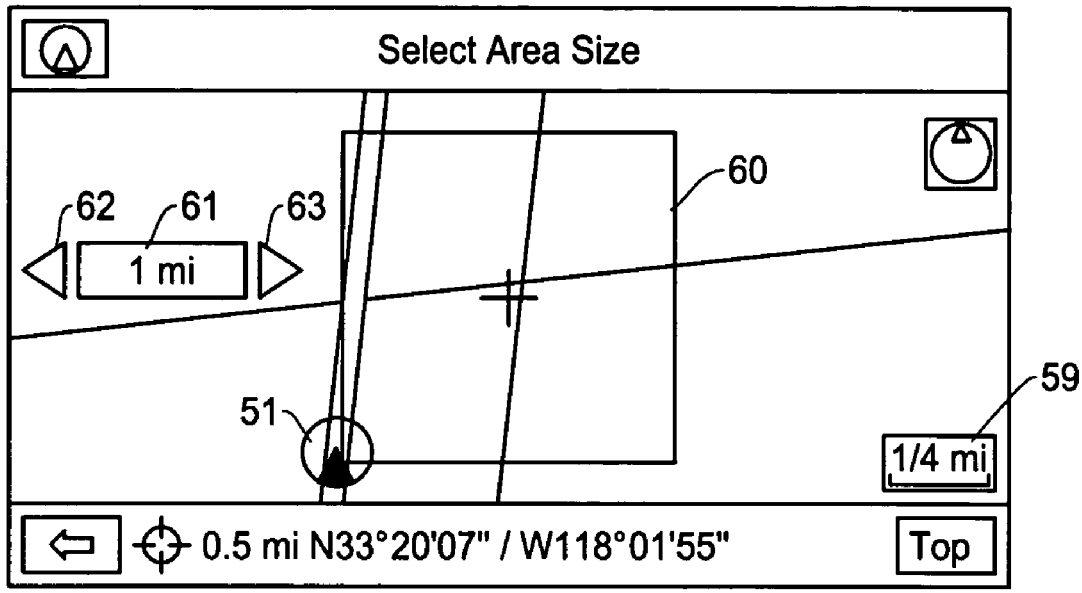
Figure 4F:
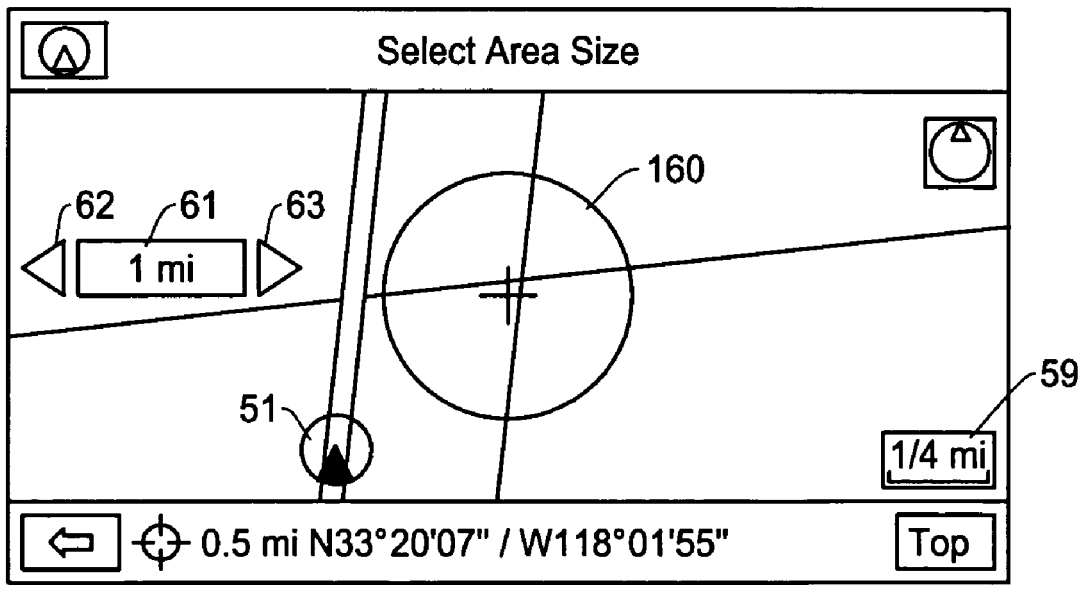

By selecting keys 62 and 63, the size of the favorite spot mark 60 can be freely changed. Thus, FIG. 4E shows a similar display where the user can choose an area size of a favorite spot larger than that of FIG. 4D. Thus, the spot scale indicator 61 on the screen indicates that the size of the square area mark 60 is 1 mile by 1 mile. As noted above, although the favorite spot is defined by a square area mark in the displays of FIGS. 4D and 4E, other shapes are also feasible. For example, FIG. 4F shows a circle representing an area of a favorite spot defined by the user by a different shape of area mark 160. In FIG. 4F, the spot scale indicator 61 preferably shows a diameter or a radius of the circle shaped area mark 160.

FIGS. 5A–5E are examples of display on the screen of the navigation system of the present invention involved in the procedure for assigning a name to the favorite spot. When the user has selected the location and size of the favorite spot in the procedure shown in FIGS. 4A–4F, the navigation system prompts the user to enter a specific name of the favorite spot. Thus, the user assigns a name of the favorite spot in the steps of FIGS. 5A–5E.

Figure 5A:
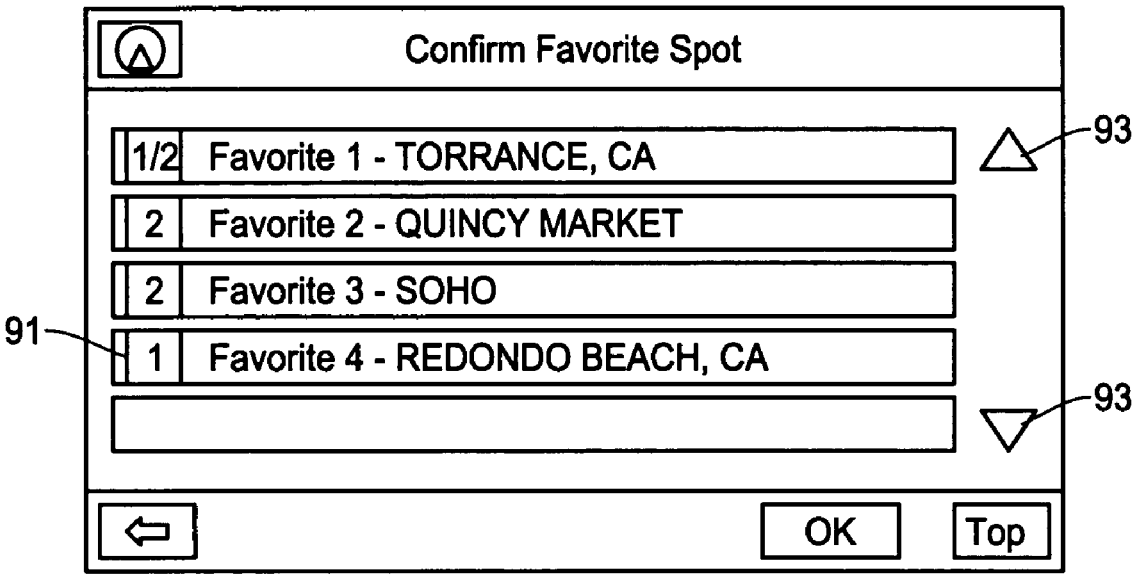

FIG. 5A is an example of display showing the list of favorite spots. The favorite spot defined in FIGS. 4A–4F is listed on the fourth row of the entries in FIG. 5A which is indicated by a reference numeral 91 as "Favorite 4". Each name also includes a size of the spot such as ½ mile, 2 mile, or 1 mile in a small box. In this example, the name of the city where the spot is located is displayed as a default name. Since "Favorite 4" has not been assigned with a name, the city name of "Redondo Beach" is shown as a default name. The user may choose to accept or change the default name. the user can see other entries in the list by pressing the scroll keys 93.

Figure 5B:
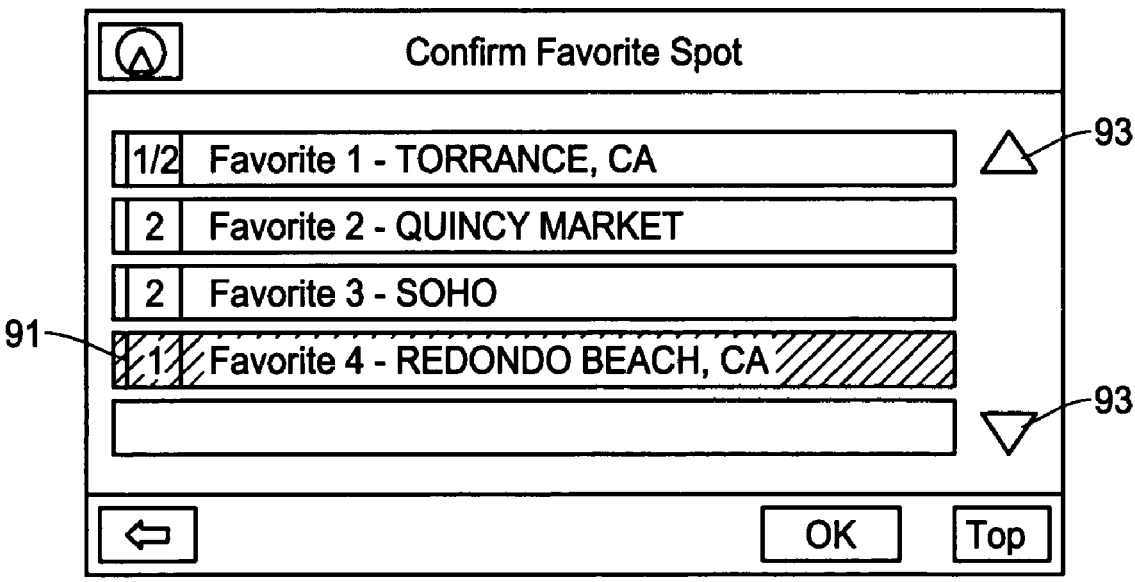

In FIG. 5B, the user has selected the entry for the favorite spot to be named as shown by highlighting the newly created favorite spot entry 91. Then the navigation system displays the keyboard screen as shown in FIG. 5C so that the user can input a favorite spot name. The user can input a desired name by selecting numeral and alphabetical keys on the keyboard of FIG. 5C which will be displayed in a text window 71 on the screen.

The characters being input on the display are shown in FIG. 5D. In this example, the user has input the word "BEACH" as shown in the text window 71 to register the name of the favorite spot. When the user presses the "Save" button, the favorite spot is registered with the assigned name. Although a touch–screen input method is used in this specific example, other input means such as a voice recognition system or a remote controller may also be used.

Figure 5E:
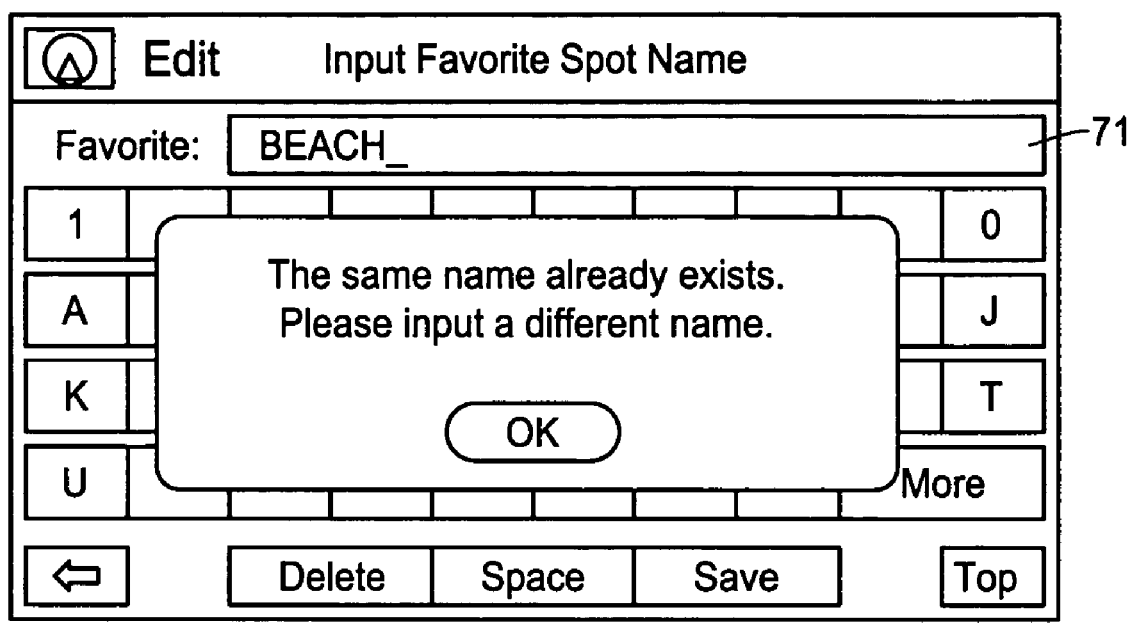

In the case where the same spot name exists, the navigation system will alert the user that the same name already exists in the system as shown in FIG. 5E. In this manner, the navigation system prompts the user to input a different name or modify the name of the preexisting favorite spot. Typically, the user inputs the name different from that registered in the navigation system and presses the "Save" key to register the new name.

Figure 6A:
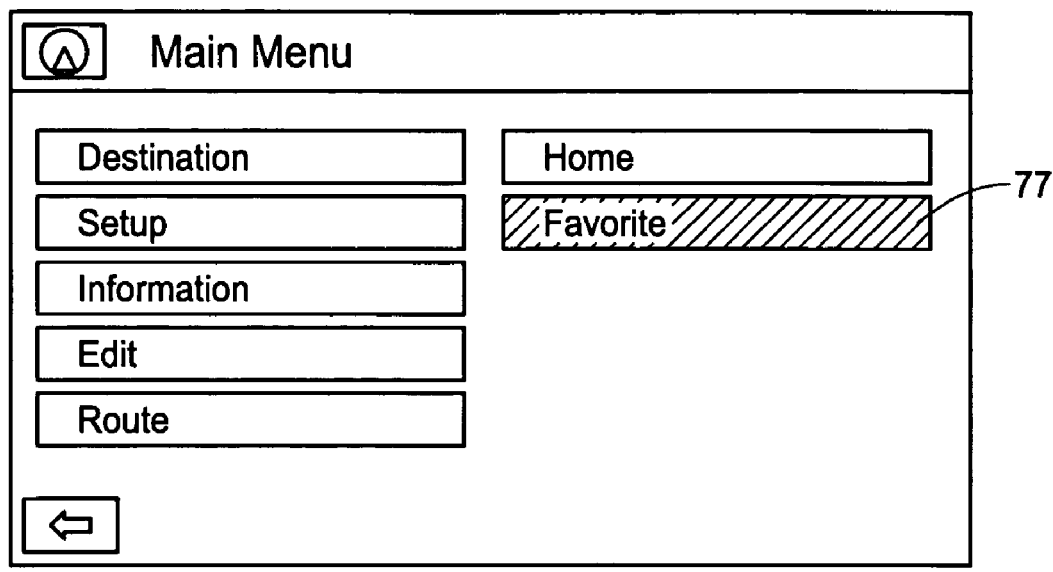
FIGS. 6A–6D are display examples showing a procedure for using the favorite spot function of the navigation system where
Figure 6B:
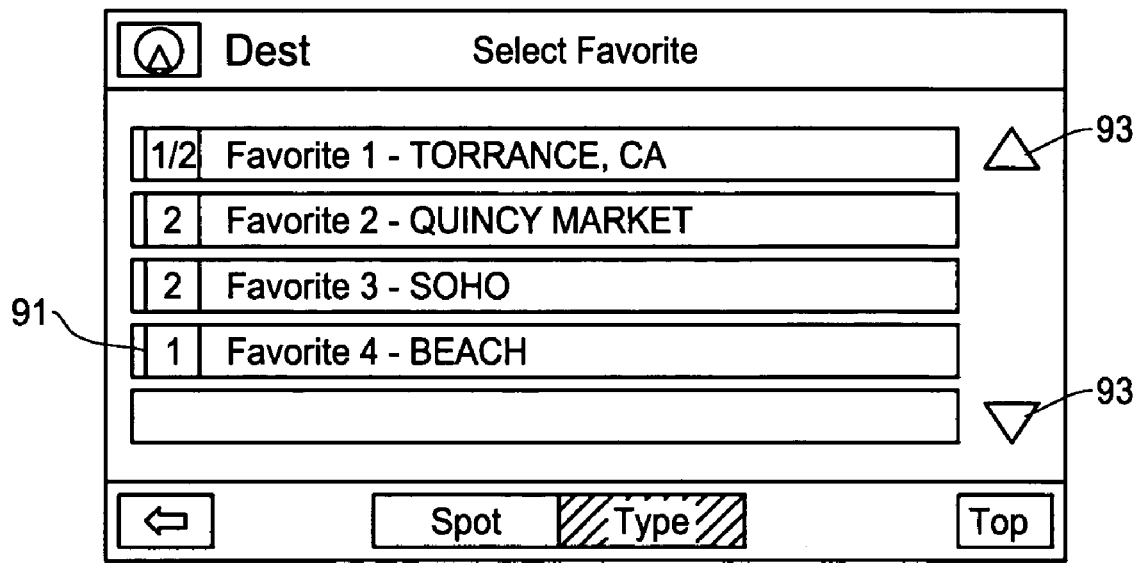
Figure 6C:
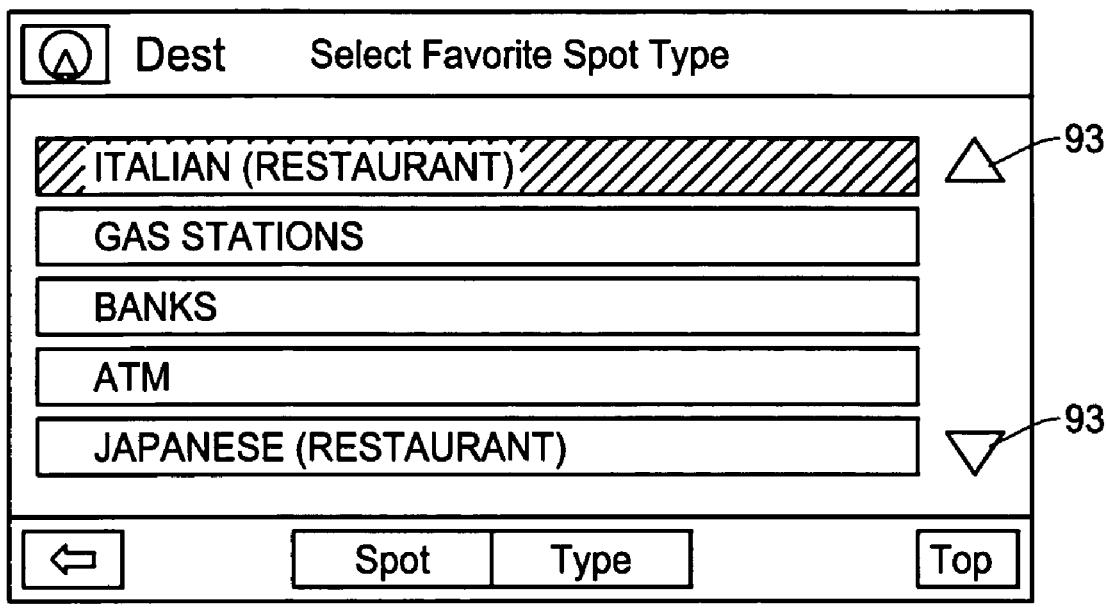
Figure 6D:
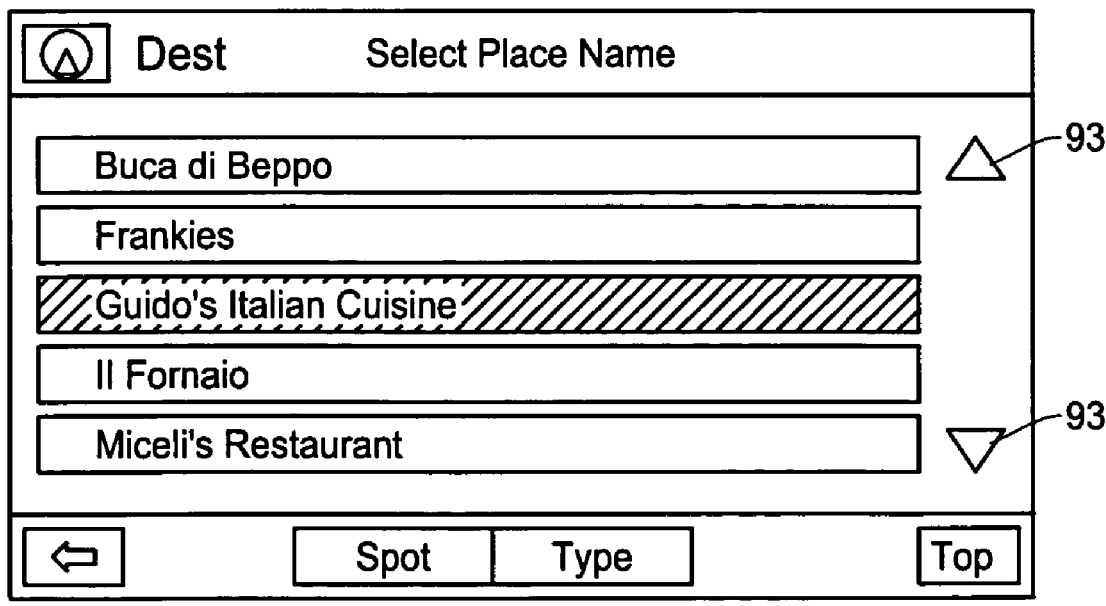

Next, the procedure to extract the information associated with the favorite spot defined in the above procedure is explained for the embodiment of the present invention. FIGS. 6A–6D are display examples showing a procedure for using the favorite spot function provided in the navigation system of the present invention. FIG. 6A shows a main menu screen from which the user can select a particular entry, FIG. 6B shows a list of favorite spot names when a "Favorite" button denoted by a reference number 77 is selected in FIG. 6A. FIG. 6C shows a list of favorite spot type when a "Type" is selected in FIG. 6B without selecting the name of the favorite spot, and FIG. 6D shows a list of place names when the favorite type is selected in FIG. 6C.

In the main menu shown in FIG. 6A, the user can select a desired menu button from among several items of the main menus of the navigation system. In this example, the user has selected a "Favorite" button to use the favorite spot function. In response, the navigation system displays a list of favorite spots registered as shown in FIG. 6B, so that the user can select one of the names of the favorite spot. In FIG. 6B, rather than selecting the favorite spot name from the name list, the user may select a favorite "Type" button on the screen.

In response, the navigation system displays a list of favorite types as shown in FIG. 6C. This list of favorite types is similar to a list of points of interest (POI). In other words, the navigation system can produce a list of favorite POI types registered in the navigation system by the user. When the user selects the favorite type such as "Italian Restaurant", the navigation system displays a list of Italian restaurants within the predetermined distance from the current position or the predetermined number in FIG. 6D so that the user can select one of the place names.

Figure 7A:
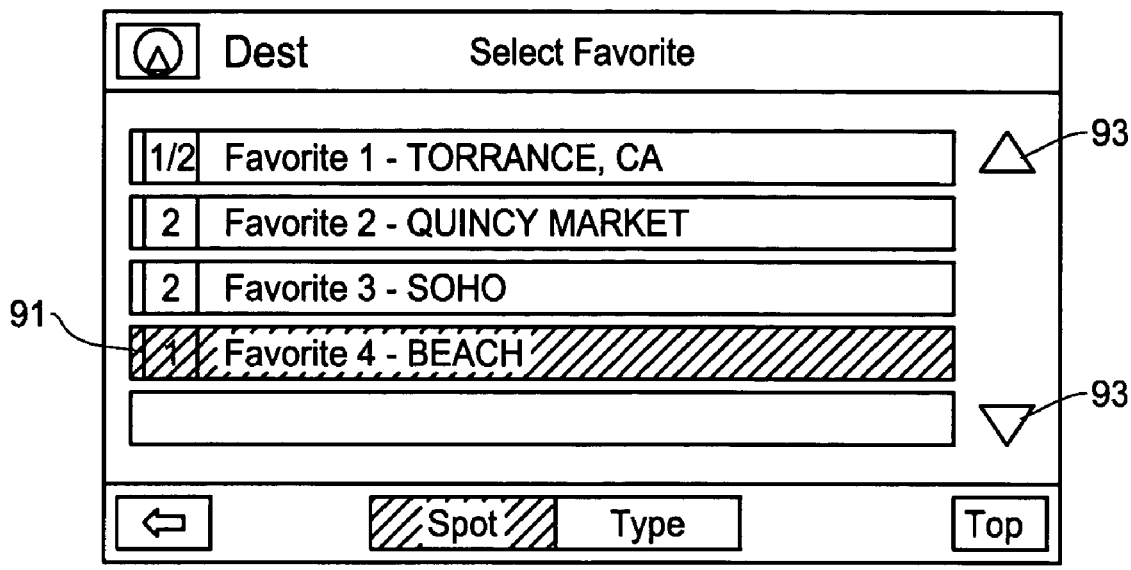
FIGS. 7A–7D are display examples of the present invention showing the map image and the associated favorite spot and a list of choices.
Figure 7B:
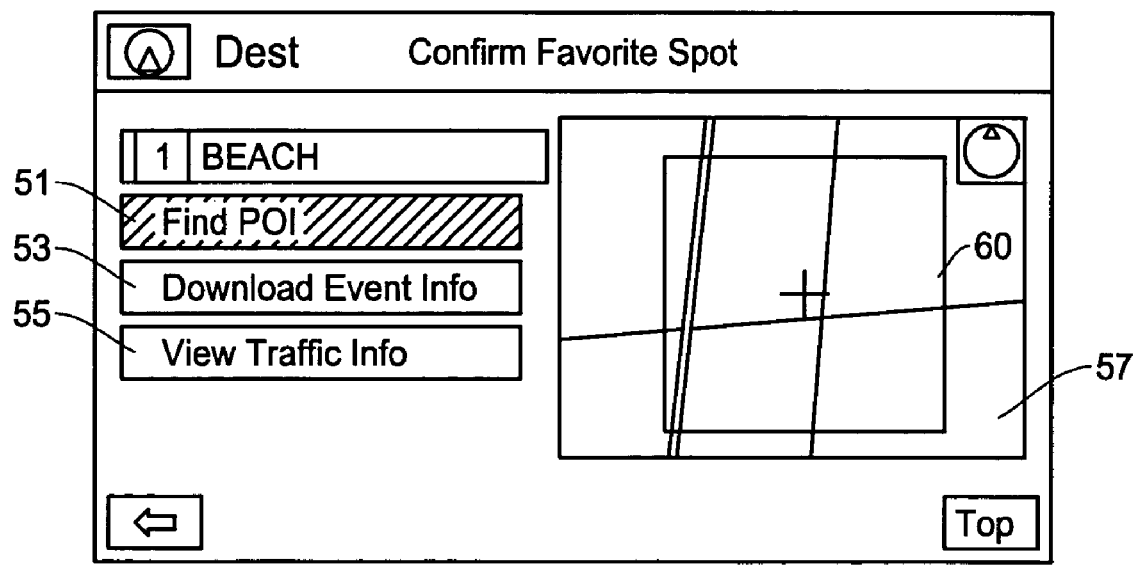
Figure 7C:
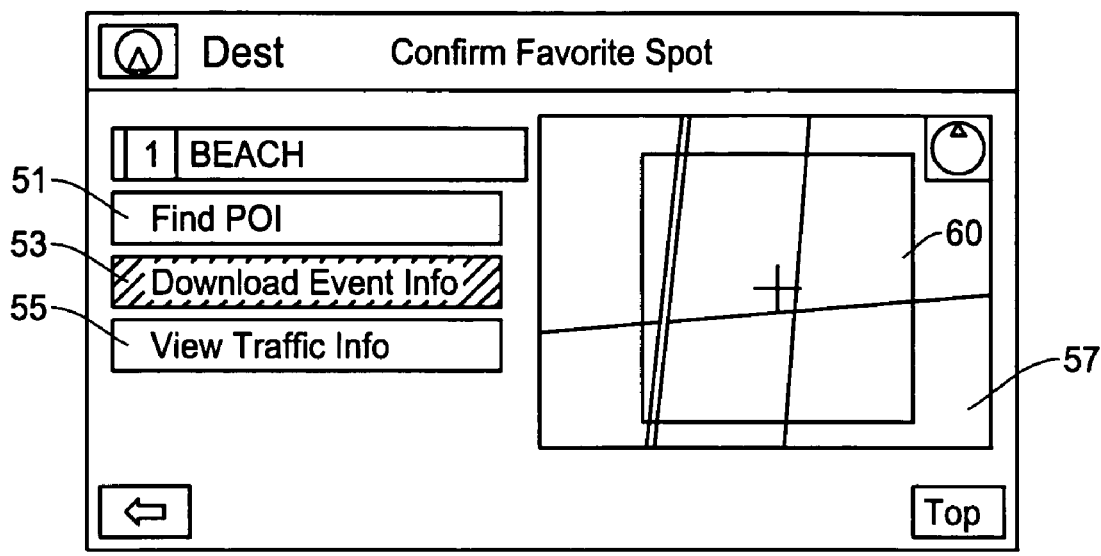
Figure 7D:
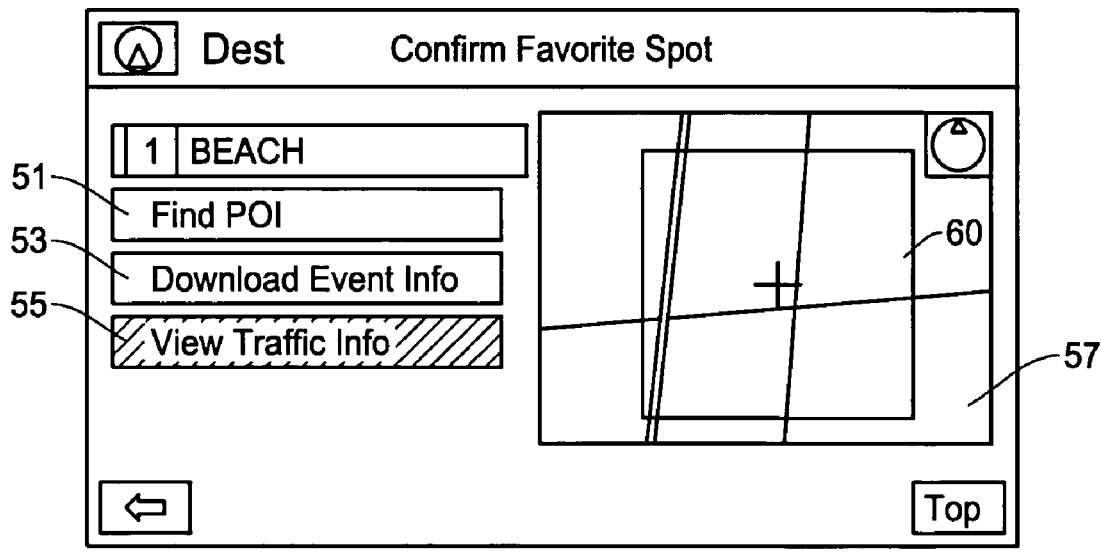

FIGS. 7A–7D are display examples of the present invention showing the map image of the selected favorite spot and a list of information types, i.e., activities. FIG. 7A shows a list of favorite spots registered in the navigation system. FIG. 7B shows an example of map image of the selected favorite spot and a list of information types or activities where "Find POI" is selected. FIG. 7C shows a case where "Download Event Information" is selected from the list of information types. FIG. 7D shows a case where "View Traffic Information" is selected from the list of information types (activities).

As shown in FIG. 7A, the navigation system displays the name list of the favorite spots which is basically the same as that shown in FIG. 6B. In other words, when selecting the favorite "Spot" at the bottom of the screen in FIG. 7A, rather than selecting the favorite "Type" (FIG. 6B), the navigation system provides the user to select one or more favorite spot for further proceeding to use this function. In this example, the user selects the favorite spot name "BEACH" to extract information associated with this favorite spot.

In response, as shown in FIG. 7B, the navigation system displays a map image 57 of the selected favorite spot "BEACH" and a list of activities for collecting the information on the selected favorite spot. In this example, the list of activities includes "Find POI" for searching points of interest within the favorite spot, "Download Event Information" for retrieving event information such as movie, sports, concert, etc. within the favorite spot from a remote service provider, and "View Traffic Information" for retrieving traffic incident information such as accident, congestion, construction, etc. within the favorite spot from a traffic data server.

In FIG. 7B, the "Find POI" key is activated to retrieve the POI information such as place types and place names in the favorite spot, which will be described in detail with reference to FIGS. 8A–8D. In FIG. 7C, the "Download Event Information" key is activated to retrieve the event information through the wireless receiver in the navigation system, which will be described in detail later with reference to FIGS. 9A–9D. In FIG. 7D, the "View Traffic Information" key is activated to retrieve the traffic incident data through the wireless receiver in the navigation system, which will be described in detail later with reference to FIGS. 10A and 10B.

Figure 8A:
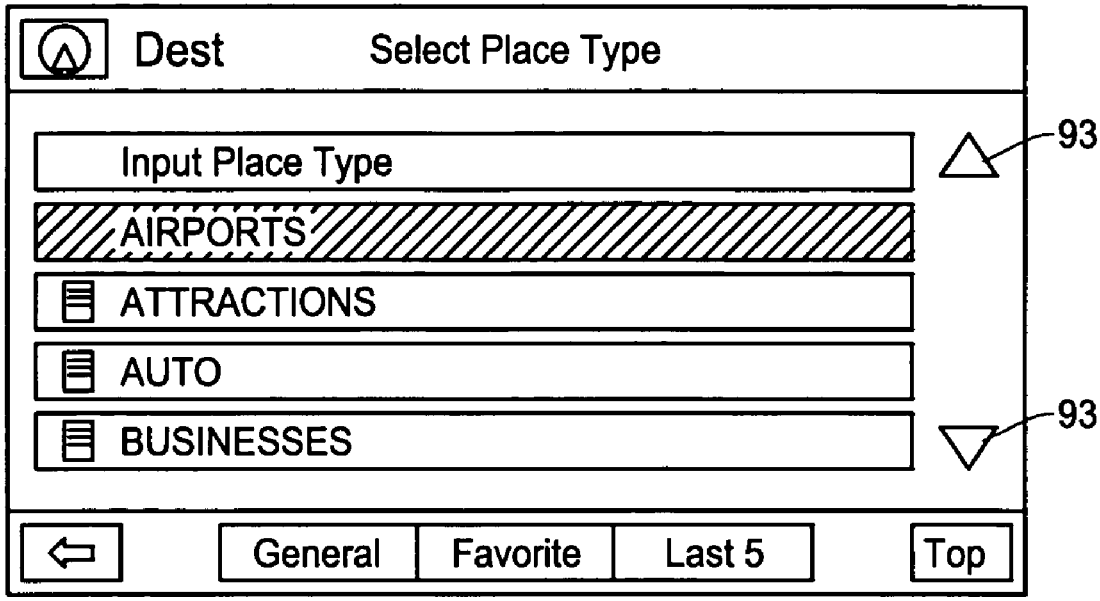
FIGS. 8A–8D are display examples showing a procedure for finding points of interest (POIs) within the favorite spot selected in FIG. 7A.

FIGS. 8A–8D show the display examples for finding points of interest within a particular favorite spot. The process of FIGS. 8A–8D starts when the user selects the activity "Find POI" in FIG. 7B after specifying the favorite spot "BEACH". In FIG. 8A, the navigation system displays a list of categories (place types) of points of interest (POI) within the favorite spot "BEACH". Then the user may select, for example, the place type "AIRPORTS" to search any airport located within the favorite spot. The scroll keys 93 at the right side allow the user to scroll the list to see other categories.

Figure 8B:
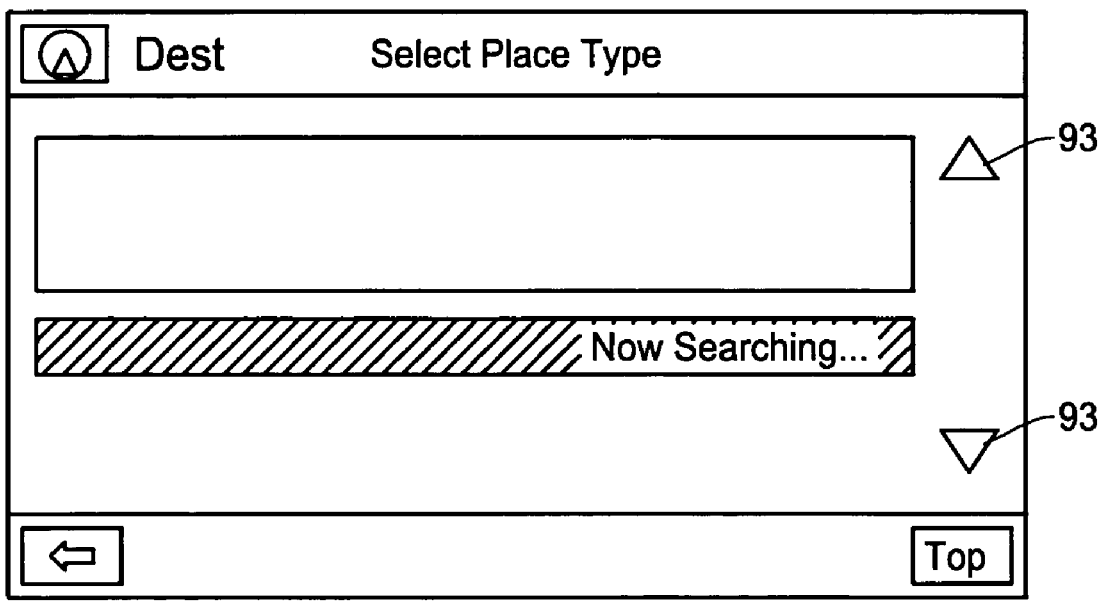

In the example of FIG. 8B, it is assumed that the category for "FAST FOOD (RESTAURANT)" which does not exist within the area of the specified favorite spot is selected by the user. The navigation system of the present invention searches the points of interest that are under the category of "RESTAURANT" within the favorite spot "BEACH". While the search is in progress, the navigation system displays a screen indicating that the navigation system is searching points of interest as shown in FIG. 8B.

Figure 8C:
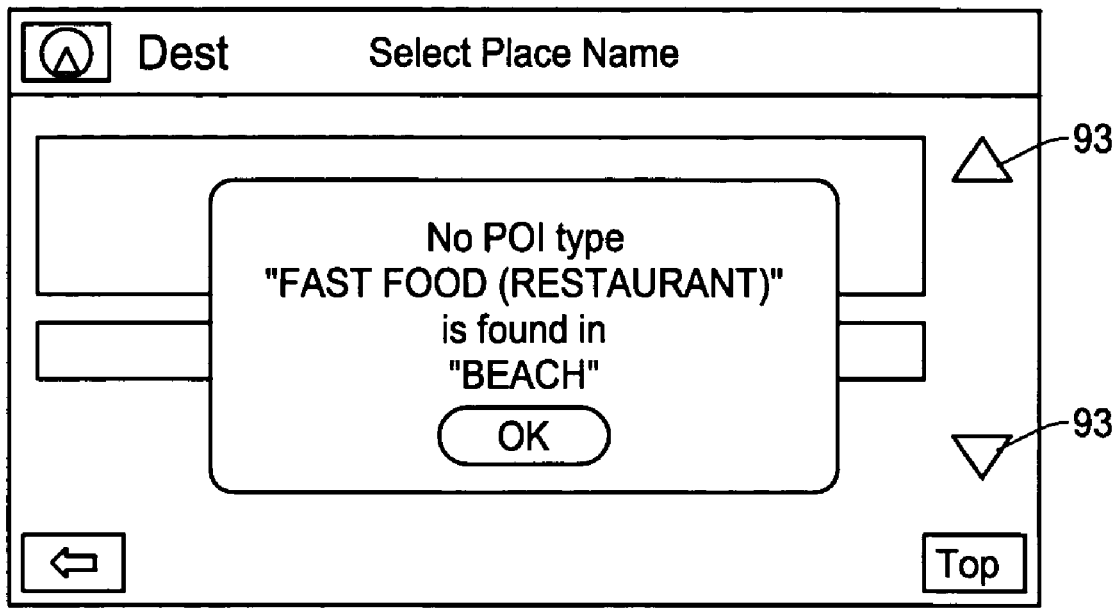
Figure 8D:
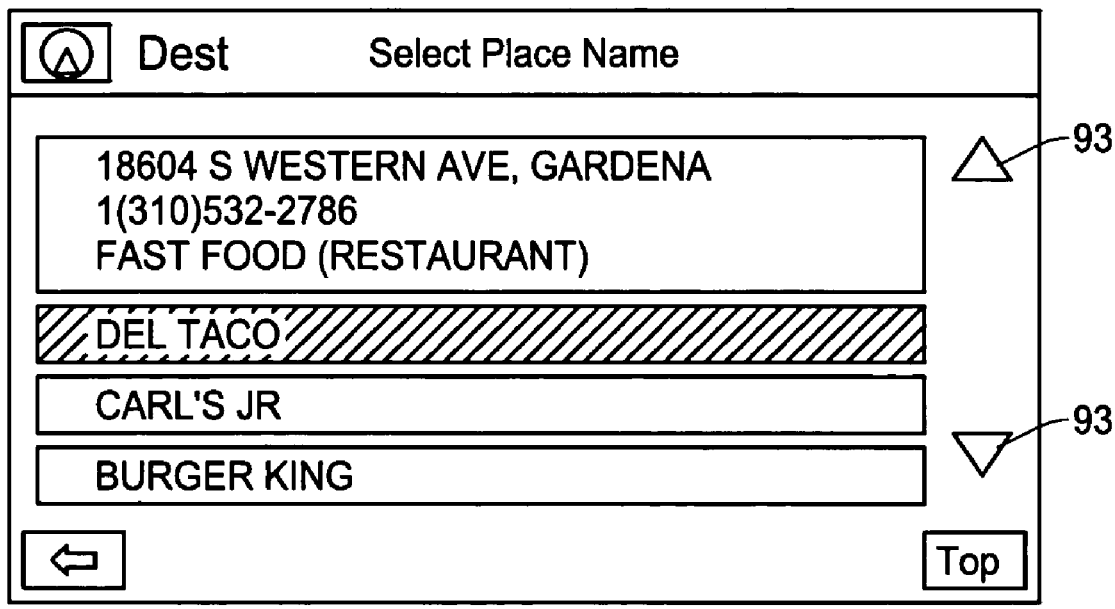

FIG. 8C shows an example of a display when the points of interest for "FAST FOOD (RESTAURANT)" category are not found within the favorite spot "BEACH". In this example, the navigation system displays a message on the screen that no POI type specified by the user is found in the selected favorite spot. If one or more points of interest which match the specified place type are found for the selected favorite spot, the navigation system displays a list of POI place names within the favorite spot as shown in FIG. 8D.

FIGS. 9A–9D are display examples of the present invention where the user has selected the activity "Download Event Information" in the process of FIG. 7C after specifying the favorite spot "BEACH". The event information refers to information on events such as movies, concerts, sports, parades, etc., that are held within the particular favorite spot. Because the event information changes by date, time, etc., the navigation system that can constantly extract information from a data server is advantageously used to download the information through the wireless receiver 49 (FIGS. 2 and 3).

Figure 9A:
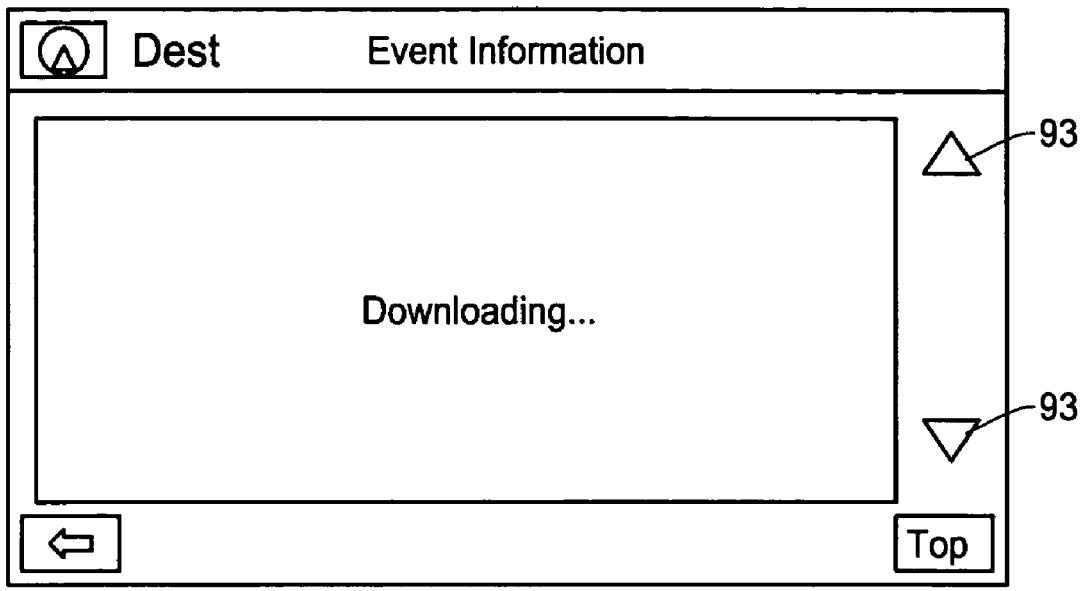
FIGS. 9A–9D are display examples of the present invention showing the procedure of retrieving and displaying event information for the favorite spot selected in FIG. 7A.
Figure 9B:
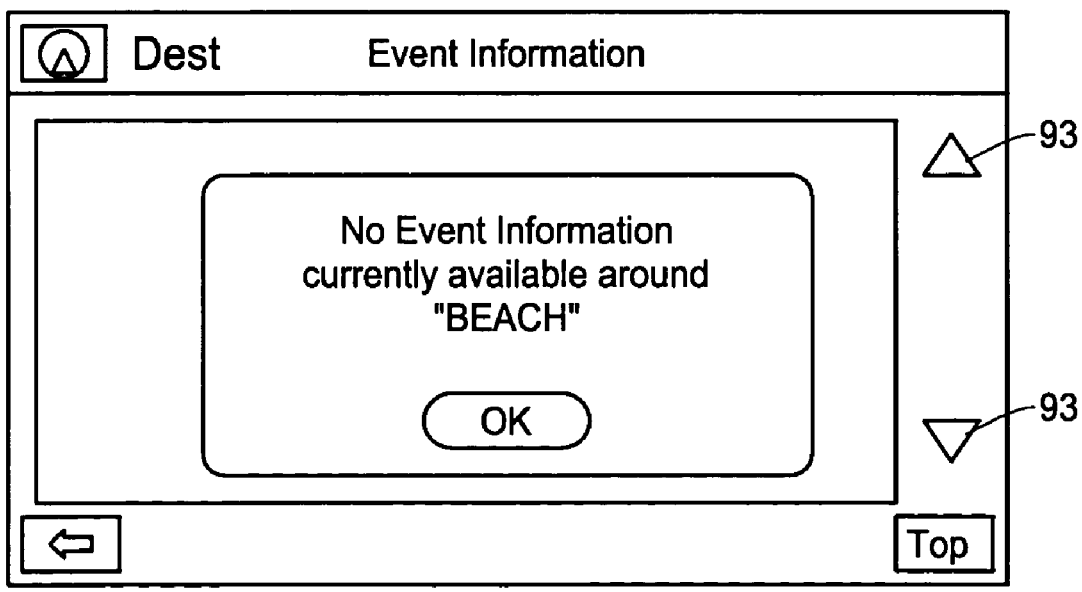

When the "Download Event Information" key is pressed as shown in FIG. 7C, the navigation system informs the user that the system is downloading the event information from the remote event data server as shown in FIG. 9A. Typically, such downloading the data from the event data server is made through a wireless communication using, for example, an FM radio network or a satellite radio system. After downloading the event information, the navigation system displays the relevant event information. In the case where there is no event within the specified favorite spot, the navigation system announces a message such as shown in FIG. 9B to inform the user that there is no event information available with respect to the particular favorite spot.

Figure 9C:
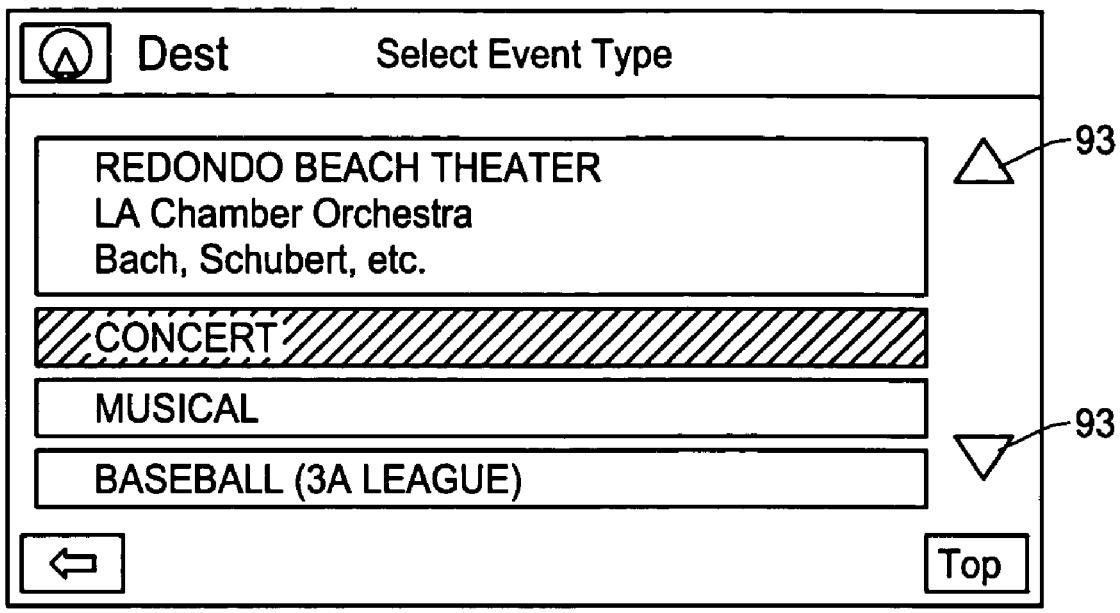

When the navigation system is able to extract the event information for the particular favorite spot, the navigation system displays a list of event information as shown in FIG. 9C. In this example, the navigation system displays a list of different event types within the favorite spot so that the user can select a type of event to see the detailed information of the selected event. It is also possible to reserve the seat and purchase a ticket of the event through the wireless communication with the event data server.

Figure 9D:
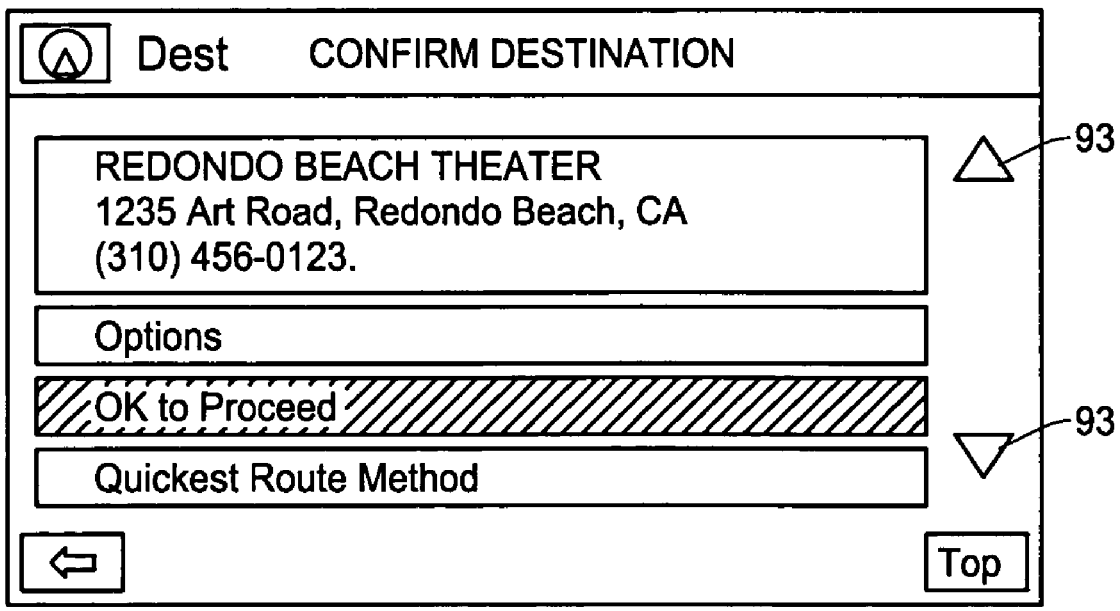

If the user decides to go to a particular event such as a concert in the situation of FIG. 9C by highlighting this event and pressing an enter key, the navigation system moves to a screen to confirm the destination as shown in FIG. 9D. When the user presses an "OK to Proceed" key, the navigation system calculates a route to the destination and guides the user to the destination.

Figure 10A:
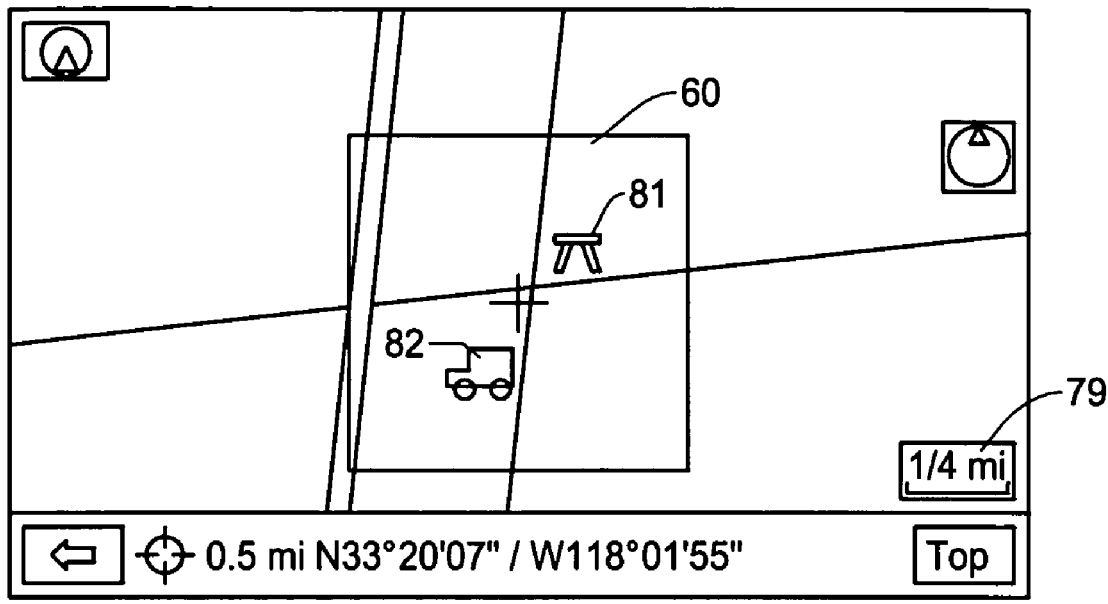
FIGS. 10A and 10B are display examples in the favorite spot defining and data retrieving method and apparatus of the present invention showing traffic information associated with the favorite spot.
Figure 10B:
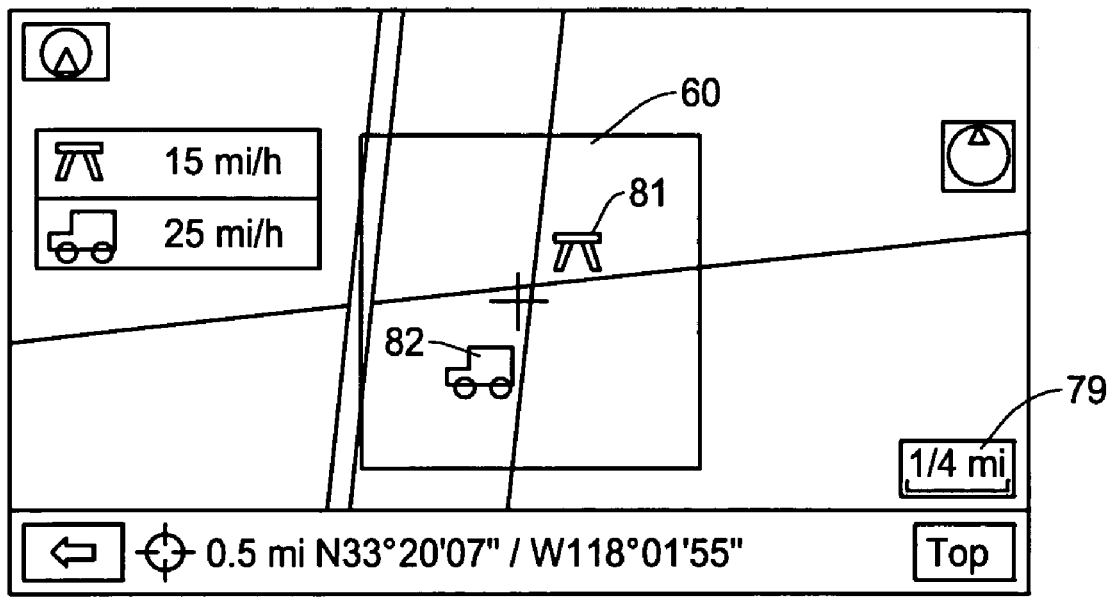

FIGS. 10A and 10B are display examples in the navigation system of the present invention involved in extracting traffic information regarding the specified favorite spot. The process of FIGS. 10A–10B starts when the user selects the activity "View Traffic information" in the process of FIG. 7D after specifying the favorite spot "BEACH". Here, the traffic information refers to information as to whether there is an accident, construction, congestion, stalled vehicle, etc. Typically, such traffic information is available from a traffic information server through a wireless communication using, for example, an FM radio network or a satellite radio system.

In the example of FIG. 10A, the navigation system displays the traffic information by traffic incident icons 81 and 82 on the map image. The traffic incident icon 81 shows the construction on the road within the area mark 60 of the specified favorite spot. The traffic incident icon 82 shows the stalled vehicle on the road within the specified favorite spot. Many other ways of displaying the traffic information are possible. In the example of FIG. 10B, the display of the navigation system also includes information on traffic speed associated with the traffic incidents such as 15 miles per hour because of the construction or 25 miles per hour because of the stalled vehicle. The user can decide whether to visit the favorite spot based on the traffic information or instruct the navigation system to avoid a location of the traffic incident when calculating a route to the destination.

Figure 11A:
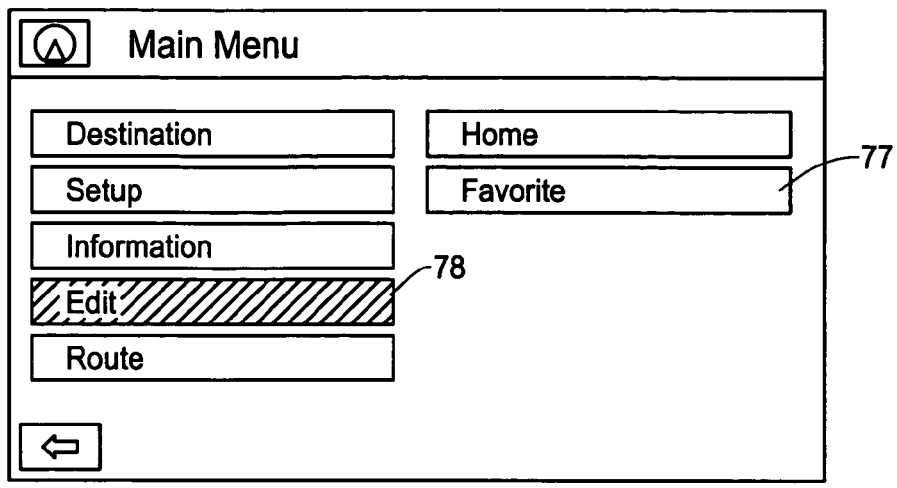
FIG. 11A is a main menu of the navigation system for selecting an "Edit" menu.
Figure 11B:
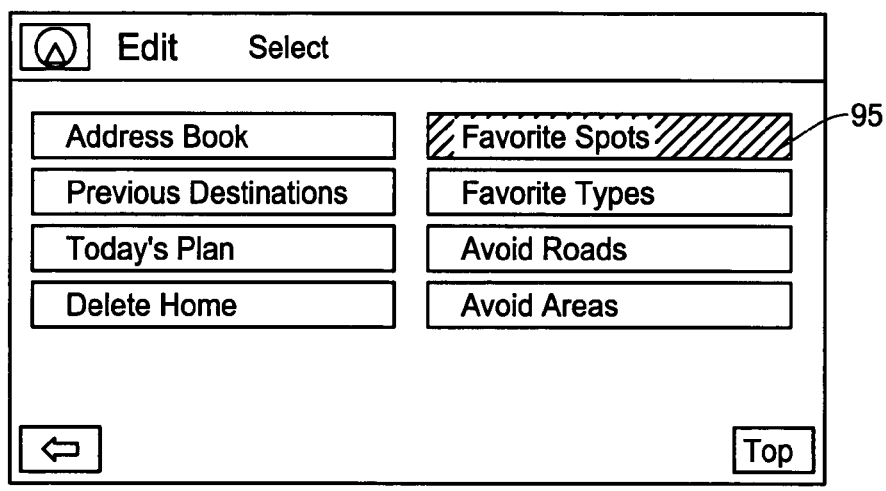
FIG. 11B shows a list of entries in the edit screen that can be edited by a user.
Figure 11C:
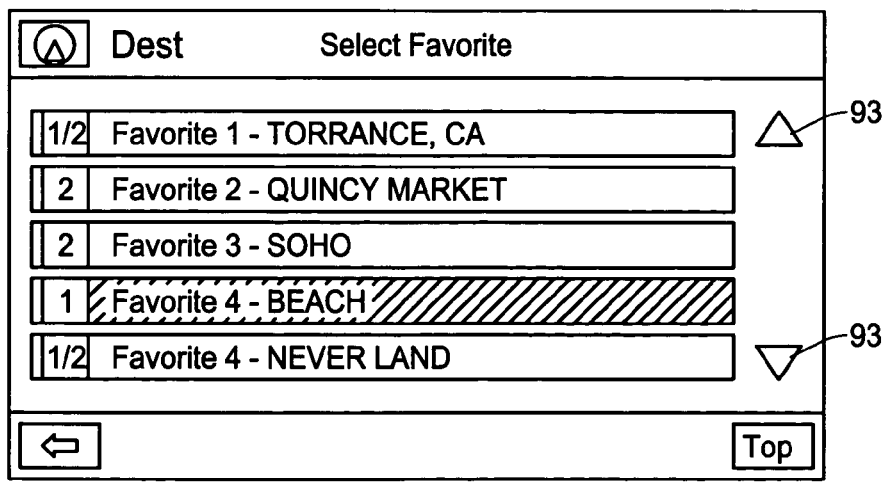

The process of editing the favorite spot will be described in detail with reference to FIGS. 11–15. FIGS. 11A–11C show a basic process of selecting the favorite spot to be edited in the navigation system of the present invention. The user starts the edit process by selecting an "Edit" menu on the main menu screen of FIG. 11A which is the same as that shown in FIG. 6A.

Figure 1A:
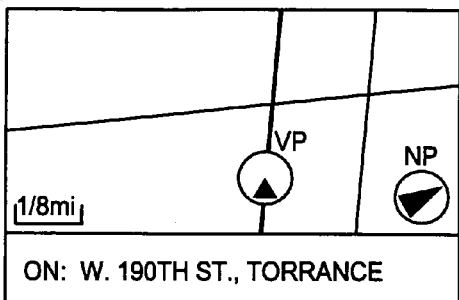
FIGS. 1A–1H are schematic diagrams showing an example of process and screen display of a navigation system for specifying one or more destinations, determining a route to the destination, and guiding the user to the destination.
Figure 1B:
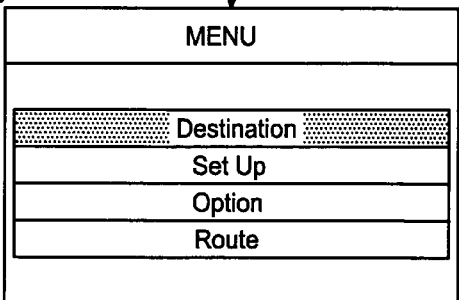
Figure 1C:
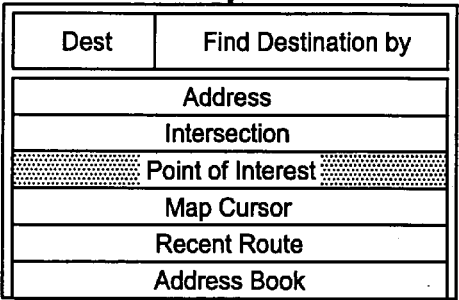
Figure 1D:
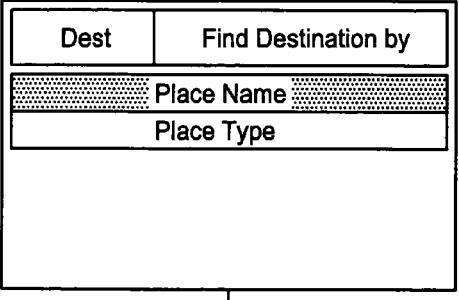
Figure 1E:
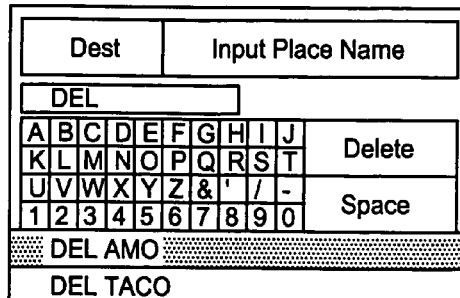
Figure 1F:
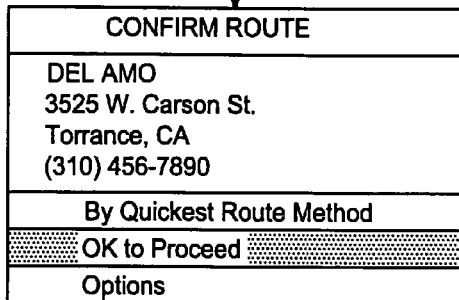
Figure 1G:
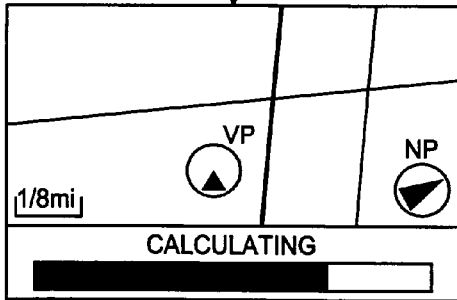
Figure 1H:
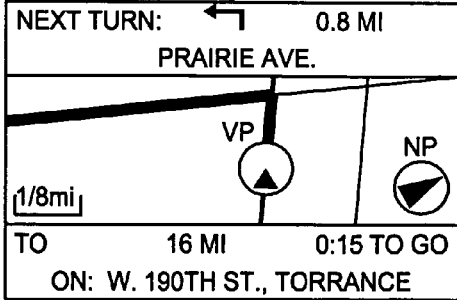

Then the navigation system displays a list of items used in the navigation system as shown in FIG. 11B to prompt the user to select one of the items for the edit process. When the user selects the "Favorite Types", the user can specify the favorite type of points of interest so that the navigation system can display the list such as shown in FIG. 6D when the "Type" key is pressed in FIG. 6B. When the user selects the "Favorite Spots" indicated by a numeral 75, the navigation system displays a list of favorite spots registered in the system as shown in FIG. 1C. The user can select a favorite spot to be edited by pressing the favorite spot. In this example, the favorite spot named "BEACH" is selected for editing.

Figure 12A:
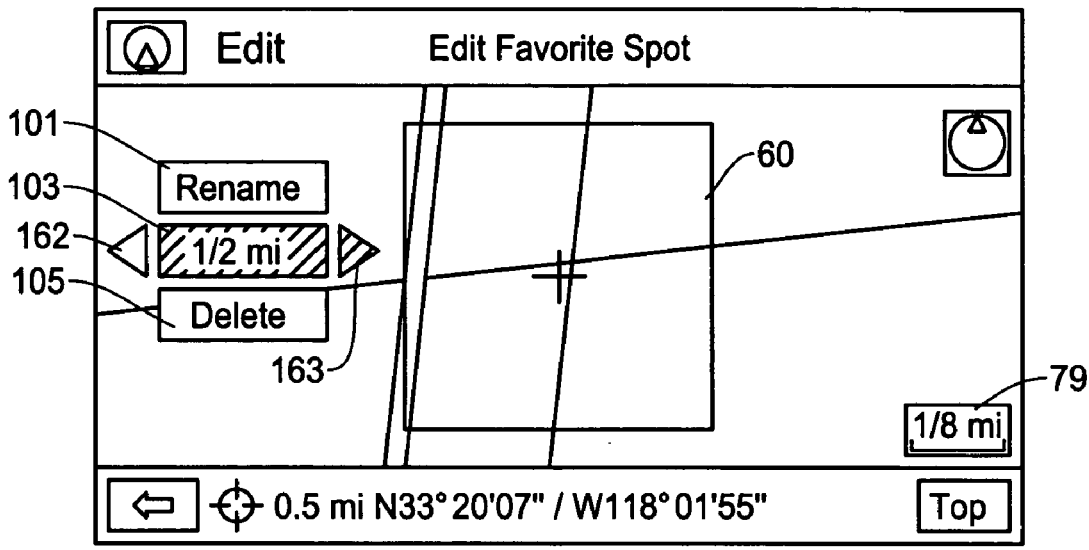
FIGS. 12A–12B are display example of the present invention listing entries of the favorite spot that can be edited and map image of the selected favorite spot where

The navigation system then displays the map image of the selected favorite spot along with categories of edit operation for the favorite spot as shown in FIG. 12A. In this example, the navigation system provides three different categories of edit operation, i.e., rename, spot size, and delete. The rename operation is to change the name of the favorite spot, the spot size operation is to change the size of the favorite spot, and the delete operation is to remove the registered favorite spot from the system. Although not shown, the location of the favorite spot can also be modified by changing the center position of the area mark 60.

Figure 12B:
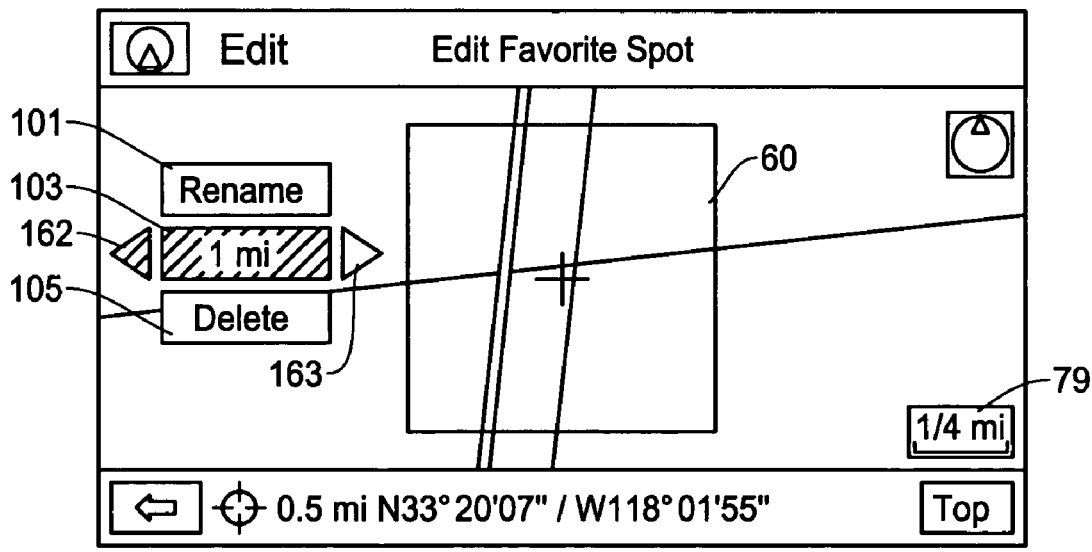

In the example of FIG. 12A, the category indicating the size of the favorite spot as indicated by a reference number 103 is highlighted. In this example, the user may change the size of the selected favorite spot "BEACH" by pressing the size indicator 103 and arrow keys 162 and 163. The size may be changed to a predetermined set of sizes, such as, ½ mile, 1 mile, 2 mile, etc. per side length when the favorite spot is square shaped. In FIG. 12A, the arrow key 163 is pressed to increase the area size of the favorite spot "BEACH". In FIG. 12B, the arrow key 162 is used to decrease the area size of the favorite spot.

Figure 13A:
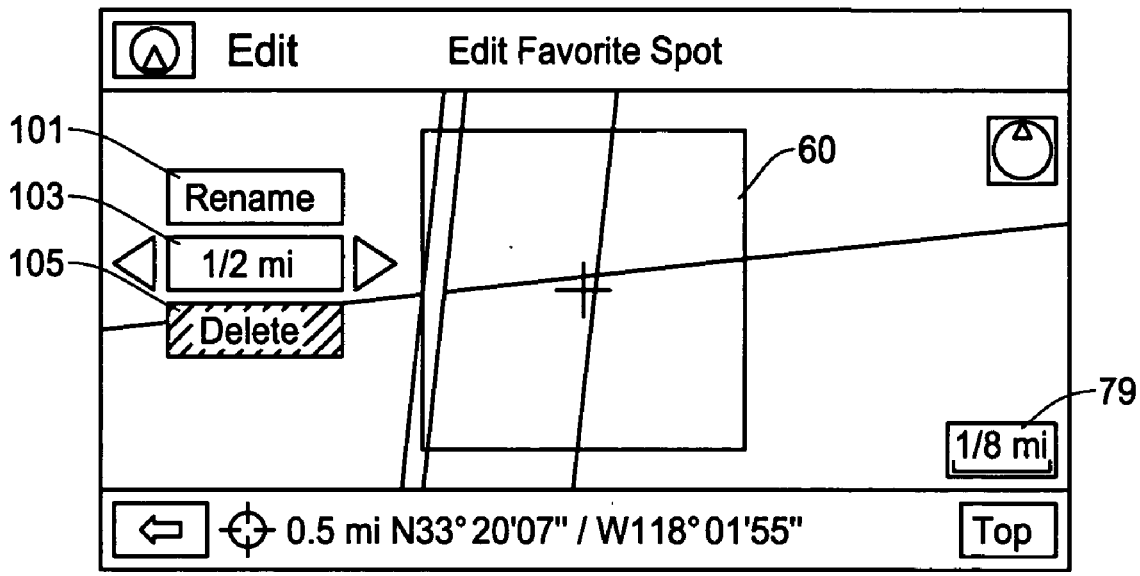
FIGS. 13A–13B are display examples of the present invention showing the procedure to delete the favorite spot where FIG. 13A lists entries of the favorite spot that can be edited and a map image of the favorite spot.
Figure 13B:
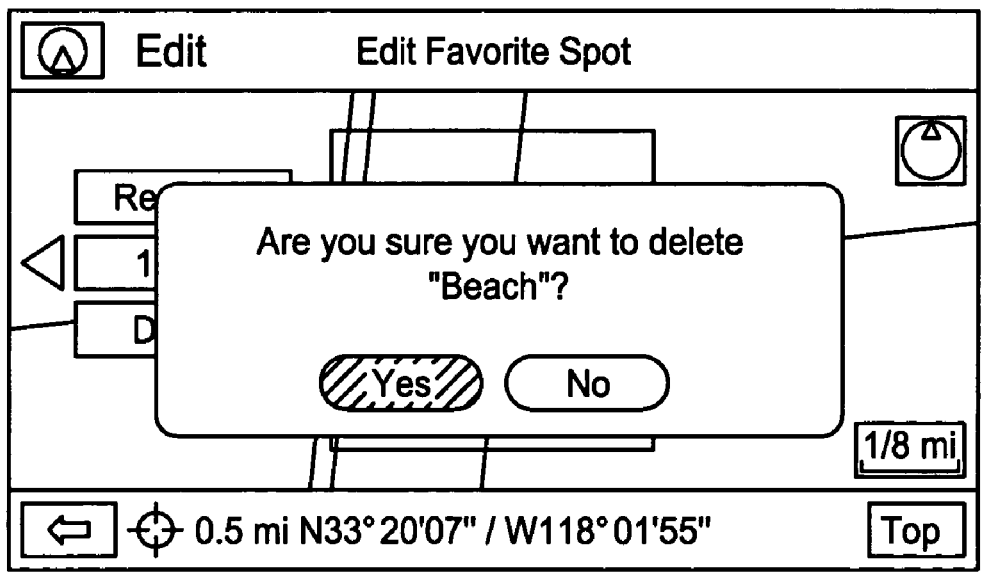

FIGS. 13A and 13B show examples of display in the procedure to delete the selected favorite spot in the present invention. In this case, the user deletes the favorite spot "BEACH" selected in the step of FIG. 11C by pressing the delete key indicated by a reference number 105. The navigation system prompts the user to confirm the choice to delete the favorite spot, to which the user can respond by pressing either a "Yes" or "No" button as shown in FIG. 13B. If the "Yes" button is pressed, the entry of favorite spot is deleted, and if the "No" button is pressed, it will cancel the procedure to delete the favorite spot.

Figure 14A:
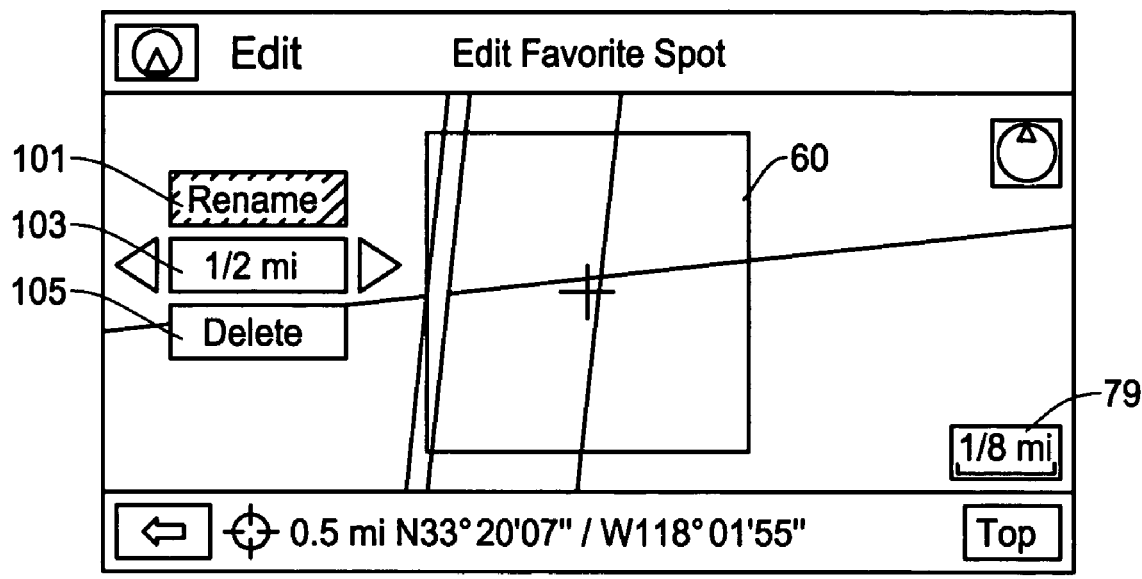
FIGS. 14A–14D are display examples of the present invention showing the procedure to rename an existing favorite spot name where FIG. 14A lists entries associated with the favorite spot that can be edited and map image of the favorite spot.
Figure 14B:
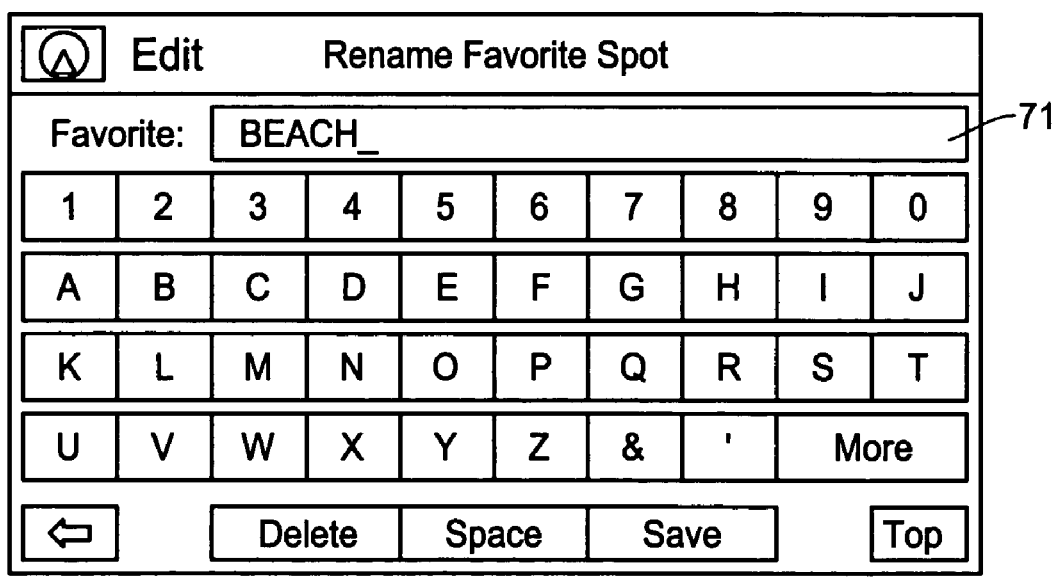

FIGS. 14A–14D show examples of display in the procedure to rename the selected favorite spot in the present invention. As shown in FIG. 14A, the user selects to rename the favorite spot by pressing the rename button indicated by a reference number 101. The navigation system displays the keyboard screen as shown in FIG. 14B so that the user can input a new name. In FIG. 14B, the original name is shown from which the user can modify to a new name. It is also feasible to display the input screen where the original name is automatically cleared to allow the user to input the name anew.

Figure 14C:
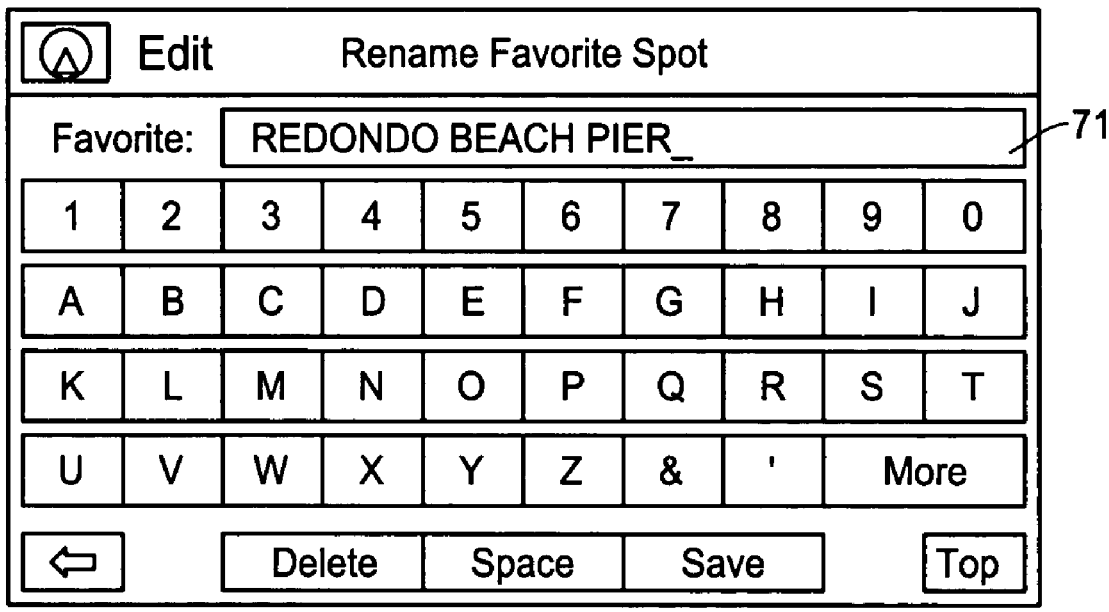
Figure 14D:
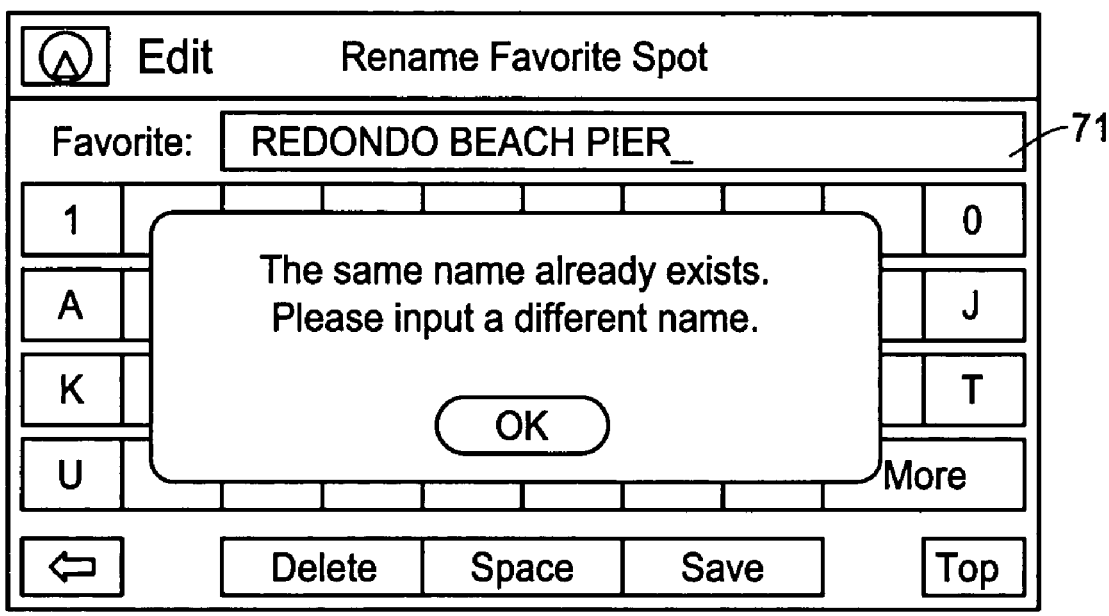

FIG. 14C indicates an input screen where the user has input "REDONDO BEACH PIER" as a new name. When the user presses the save button, the new name is saved in the navigation system, thereby replacing with "BEACH" that has been previously named. If the same name already exists as a favorite spot name, the navigation system prompts the user to input a different name as shown in FIG. 14D. It may also be feasible to allow the user to overwrite the preexisting name by the new name.

Figure 15:
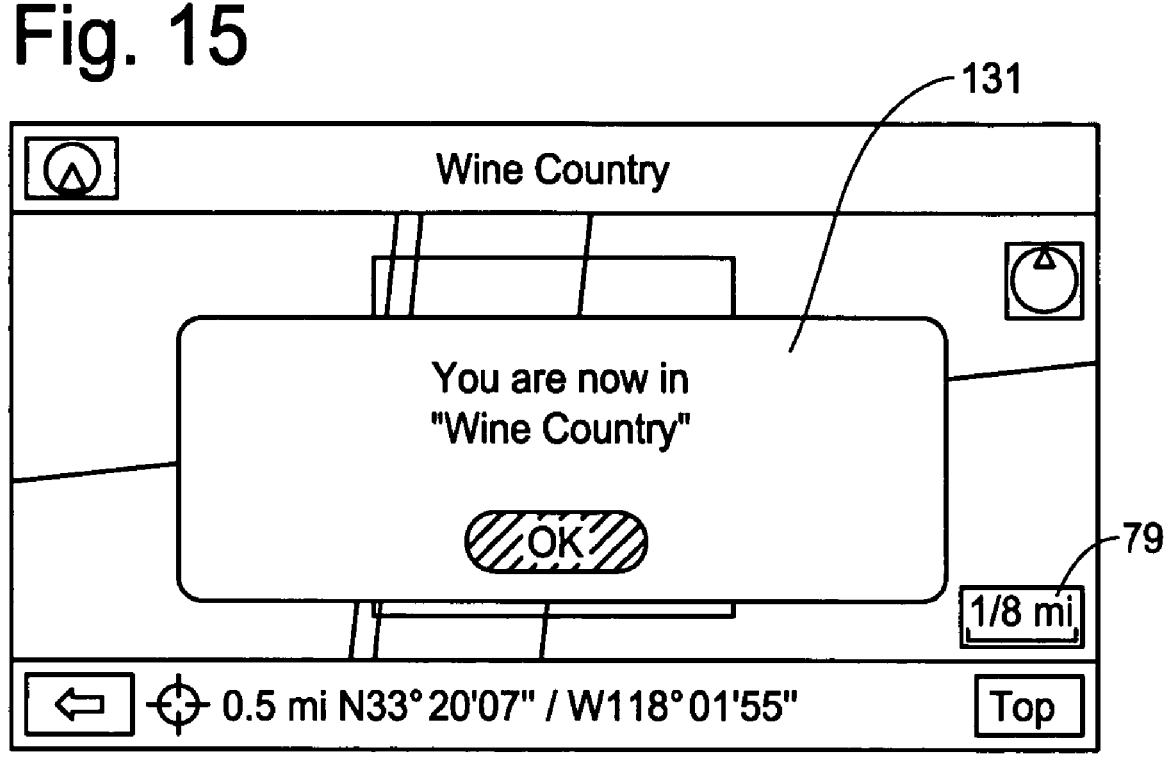
FIG. 15 is a display example involved in the favorite spot defining and data retrieving method and apparatus of the present invention which informs that the user has entered into the favorite spot registered in the navigation system.

The favorite spot function of the present invention can also be used to inform the user that the user has entered into a favorite spot. For example, as shown in FIG. 15, when the user has set up a favorite spot where many wineries are located, the navigation system will inform the user as soon as the user enters into the favorite spot or has left the favorite spot. The user can look around to enjoy the view and find points of interest, such as a winery in the favorite spot without fail.

As has been described above, because the present invention allows the user to set an arbitrary size and location on a map image as a favorite spot, the navigation system of the present invention can make a flexible guidance based on the user's preference. The user can search points of interest, event information, and traffic information within a particular favorite spot. The favorite spot function may also be used to inform the user that the user has entered a favorite spot.

Although the invention is described herein with reference to the preferred embodiment, one skilled in the art will readily appreciate that various modifications and variations may be made without departing from the spirit and scope of the present invention. Such modifications and variations are considered to be within the purview and scope of the appended claims and their equivalents.

What is claimed is:

1. A method of defining a favorite spot and retrieving information concerning the favorite spot for use with a navigation system, comprising the following steps of:
    creating one or more favorite spots by selecting a location on a map image displayed on the navigation system and setting a size of the favorite spot;
    selecting one of the favorite spots created in the navigation system;
    retrieving information associated with the selected favorite spot; and
    notifying a user that the user enters the favorite spot when the user reaches any part of the location of one of the favorite spots.

2. A method for a navigation system as defined in claim 1, wherein said step of creating the favorite spot includes a step of setting a shape of the favorite spot, and a step of assigning a name of the favorite spot.

3. A method for a navigation system as defined in claim 1, wherein said step of creating the favorite spot includes a step of registering the favorite spot in a list of favorite spot names.

4. A method for a navigation system as defined in claim 1, wherein said step of selecting one of the favorite spots created in the navigation system includes a step of displaying a list of favorite spot names.

5. A method for a navigation system as defined in claim 1, wherein said step of retrieving the information associated with the selected favorite spot includes a step of specifying a category of information to be searched for said favorite spot, a step of retrieving the information of the selected category within the favorite spot, and a step of displaying a list of retrieved information.

6. A method for a navigation system as defined in claim 5, wherein said category of information within said favorite spot is point of interest information.

7. A method for a navigation system as defined in claim 5, wherein said category of information within said favorite spot is event information.

8. A method for a navigation system as defined in claim 5, wherein said category of information within said favorite spot is traffic incident information.

9. A method for a navigation system as defined in claim 1, further comprising a step of editing the data on the favorite spot by changing a size, location, or name of the favorite spot or deleting the favorite spot.

10. A method for a navigation system as defined in claim 9, wherein said step of editing the data on the favorite spot includes a step of selecting a favorite spot to be edited, a step of selecting an item of the favorite spot to be edited, and a step of changing values of the selected item.

11. An apparatus for defining a favorite spot and retrieving information concerning the favorite spot for use with a navigation system, comprising:
    means for creating one or more favorite spots by selecting a location on a map image displayed on the navigation system and setting a size of the favorite spot;
    means for selecting one of the favorite spots created in the navigation system;
    means for retrieving information associated with the selected favorite spot; and
    means for notifying a user that the user enters the favorite snot when the user reaches any part of the location of one of the favorite spots.

12. An apparatus for a navigation system as defined in claim 11, wherein said means for creating the favorite spot includes means for setting a shape of the favorite spot, and means for assigning a name of the favorite spot.

13. An apparatus for a navigation system as defined in claim 11, wherein said means for creating the favorite spot includes means for registering the favorite spot in a list of favorite spot names.

14. An apparatus for a navigation system as defined in claim 11, wherein said means for selecting one of the favorite spots created in the navigation system includes means for displaying a list of favorite spot names.

15. An apparatus for a navigation system as defined in claim 11, wherein said means for retrieving the information associated with the selected favorite spot includes means for specifying a category of information to be searched for said favorite spot, means for retrieving the information of the selected category within the favorite spot, and means for displaying a list of retrieved information.

16. An apparatus for a navigation system as defined in claim 15, wherein said category of information within said favorite spot is point of interest information.

17. An apparatus for a navigation system as defined in claim 15, wherein said category of information within said favorite spot is event information.

18. An apparatus for a navigation system as defined in claim 15, wherein said category of information within said favorite spot is traffic incident information.

19. An apparatus for a navigation system as defined in claim 11, further comprising a step of editing the data on the favorite spot by changing a size, location, or name of the favorite spot or deleting the favorite spot.

20. An apparatus for a navigation system as defined in claim 19, wherein said means for editing the data on the favorite spot includes means for selecting a favorite spot to be edited, means for selecting an item of the favorite spot to be edited, and means for changing values of the selected item.

* * * * *